US012596453B2

(12) United States Patent
Lee et al.

(10) Patent No.: US 12,596,453 B2
(45) Date of Patent: Apr. 7, 2026

(54) TOUCH SENSOR AND A METHOD FOR DETECTING A USER'S TOUCH

(71) Applicant: SAMSUNG DISPLAY CO., LTD.,
Yongin-si (KR)

(72) Inventors: Jeong Heon Lee, Yongin-si (KR); Jung Hak Kim, Yongin-si (KR); Yun A Ma, Yongin-si (KR)

(73) Assignee: SAMSUNG DISPLAY CO., LTD.,
Yongin-si (KR)

( * ) Notice: Subject to any disclaimer, the term of this patent is extended or adjusted under 35 U.S.C. 154(b) by 0 days.

(21) Appl. No.: 18/772,415

(22) Filed: Jul. 15, 2024

(65) Prior Publication Data

US 2025/0085806 A1      Mar. 13, 2025

(30) Foreign Application Priority Data

Sep. 7, 2023     (KR) ........................ 10-2023-0119195

(51) Int. Cl.
*G06F 3/041*        (2006.01)
*G06F 3/044*        (2006.01)
(52) U.S. Cl.
CPC ........ *G06F 3/04166* (2019.05); *G06F 3/0446* (2019.05)
(58) Field of Classification Search
CPC ............... G06F 3/0445; G06F 3/04166; G06F 3/04164; G06F 2203/04111; G06F 2203/04112; G06F 3/041; G06F 3/044; G06F 3/0446; G06F 3/0412
See application file for complete search history.

(56) References Cited

U.S. PATENT DOCUMENTS

| | | | |
|---|---|---|---|
| 9,652,090 B2 | 5/2017 | Tan et al. | |
| 10,216,314 B2 | 2/2019 | Kremin et al. | |
| 2022/0155937 A1* | 5/2022 | Jo ........................ | G06F 3/04184 |
| 2022/0326831 A1 | 10/2022 | Lee et al. | |
| 2022/0342527 A1* | 10/2022 | Zhu ..................... | G06F 3/04166 |

FOREIGN PATENT DOCUMENTS

| | | |
|---|---|---|
| KR | 10-2022-0141964 A | 10/2022 |
| KR | 10-2553515 B1 | 7/2023 |

* cited by examiner

*Primary Examiner* — Robin J Mishler
(74) *Attorney, Agent, or Firm* — F. CHAU & ASSOCIATES, LLC

(57)        ABSTRACT

A touch sensor is provided. The touch sensor including: first touch electrodes; scan lines connected to the first touch electrodes; and a controller that applies a scan signal to each of the scan lines, wherein the scan signal includes a plurality of unit signals in a first time period and a second time period, and includes a gap signal in a gap period between the first time period and the second time period, and an amplitude of each of the plurality of unit signals is greater than an amplitude of the gap signal.

13 Claims, 13 Drawing Sheets

TOUCH SENSOR AND A METHOD FOR DETECTING A USER'S TOUCH

CROSS-REFERENCE TO RELATED APPLICATION

This application claims priority under 35 U.S.C. 119 to Korean Patent Application No. 10-2023-0119195 filed in the Korean Intellectual Property Office on Sep. 7, 2023, the disclosure of which is incorporated by reference herein in its entirety.

TECHNICAL FIELD

The present disclosure relates to a touch sensor and a method for detecting a user's touch.

DESCRIPTION OF THE RELATED ART

The development of information technology highlights the importance of a display device as an interface between a user and information. Consequently, the utilization of display devices, including a liquid crystal display device and, an organic light emitting display device, has seen a notable increase.

Touch signals supplied to electrodes of a touch sensor can function as electronic interference (EMI) (or noise), potentially affecting the internal components of the touch sensor, other components of the display device and/or an electronic device. This interference can lead to reduced operational reliability of the touch sensor, the display device, and/or the electronic device.

SUMMARY

Embodiments of the present disclosure provide a touch sensor and a touch sensing method in which the occurrence of electronic interference (EMI) is minimized or at least reduced.

An embodiment of the present disclosure provides a touch sensor that includes: first touch electrodes; scan lines connected to the first touch electrodes; and a controller that applies a scan signal to each of the scan lines, wherein the scan signal includes a plurality of unit signals in a first time period and a second time period, and includes a gap signal in a gap period between the first time period and the second time period, and an amplitude of each of the plurality of unit signals is greater than an amplitude of the gap signal.

A frequency of each of the plurality of unit signals and a frequency of the gap signal are the same.

Each of the plurality of unit signals and the gap signal are sinusoidal signals.

Each of the plurality of unit signals includes a first sinusoidal signal or a second sinusoidal signal having an opposite phase to the first sinusoidal signal.

The touch sensor further includes second touch electrodes configured to form mutual capacitances with the first touch electrodes, wherein the controller receives sensing signals from the second touch electrodes to generate touch data, and determines whether a first target signal among the sensing signals corresponds to one of the plurality of unit signals or to the gap signal.

The controller calculates an amplitude of the first target signal, determines that the first target signal corresponds to one of the plurality of unit signals when the amplitude of the first target signal is greater than a first reference value, and determines that the first target signal corresponds to the gap signal when the amplitude of the first target signal is less than or equal to the first reference value.

The controller calculates a frequency of the first target signal, determines that the first target signal corresponds to one of the plurality of unit signals when the frequency is a second reference value, and determines that the first target signal corresponds to the gap signal when the frequency is not the second reference value.

The controller decodes the first target signal to generate a digital code when it is determined that the first target signal corresponds to one of the plurality of unit signals.

When the first target signal includes a first sinusoidal signal, the digital code is a first value, and when the first target signal includes a second sinusoidal signal having an opposite phase to the first sinusoidal signal, the digital code is a second value.

The controller, when it is determined that the first target signal corresponds to the gap signal, determines whether a second target signal among the sensing signals corresponds to one of the plurality of unit signals or to the gap signal, and the second target signal is received after the first target signal.

An embodiment of the present disclosure provides a method for detecting a touch using first touch electrodes and second touch electrodes configured to form mutual capacitances with the first touch electrodes, the method including: applying a scan signal to each of scan lines connected to the first touch electrodes, wherein the scan signal includes a plurality of unit signals and a plurality of gap signals in a plurality of time periods; receiving sensing signals from the second touch electrodes through sensing lines; and determining, based on a characteristic value of a first target signal among the sensing signals, whether the first target signal corresponds to one of the plurality of unit signals or one of the plurality of gap signals.

Each of the plurality of unit signals and gap signals is a sinusoidal signal.

Each of the plurality of unit signals includes a first sinusoidal signal or a second sinusoidal signal having an opposite phase to the first sinusoidal signal.

The determining, based on the characteristic value of the first target signal, whether the first target signal corresponds to one of the plurality of unit signals or one of the plurality of gap signals includes: determining that the first target signal corresponds to one of the plurality of unit signals when the characteristic value is greater than a first reference value; the characteristic value is an amplitude value; and a frequency of each of the plurality of unit signals and a frequency of the gap signal are the same.

The determining, based on the characteristic value of the first target signal, whether the first target signal corresponds to one of the plurality of unit signals or one of the plurality of gap signals further includes: determining that the first target signal corresponds to one of the plurality of gap signals when the characteristic value is less than or equal to the first reference value.

The determining, based on the characteristic value of the first target signal, whether the first target signal corresponds to one of the plurality of unit signals or one of the plurality of gap signals includes: determining that the first target signal corresponds to one of the plurality of unit signals when the characteristic value is a second reference value; the characteristic value is a frequency value; and a frequency of each of the plurality of unit signals and a frequency of the gap signal are different from each other.

The determining, based on the characteristic value of the first target signal, whether the first target signal corresponds to one of the plurality of unit signals or one of the plurality of gap signals further includes determining that the first target signal corresponds to one of the plurality of gap signals when the characteristic value is not a second reference value.

The method further includes decoding the first target signal to generate a digital code when it is determined that the first target signal corresponds to one of the plurality of unit signals.

When the first target signal includes a first sinusoidal signal, the digital code is a first value; and when the first target signal includes a second sinusoidal signal having an opposite phase to the first sinusoidal signal, the digital code is a second value.

The method further includes when it is determined that the first target signal corresponds to the gap signal, determining, based on a characteristic value of a second target signal among the sensing signals, whether the second target signal corresponds to one of the plurality of unit signals or one of the plurality of gap signals, wherein the second target signal is received after the first target signal.

According to the touch sensor and the touch sensing method of the present disclosure, the occurrence of EMI may be minimized or reduced by utilizing a touch signal with a small frequency component.

BRIEF DESCRIPTION OF THE DRAWINGS

FIG. 2 illustrates a timing diagram of scan signals that may be applied to scan lines of FIG. 1 in one frame.

FIGS. 9, 10, 11, 12, 13, 14 and 15 are drawings for explaining a configuration of a display device for use with embodiments of the present disclosure.

DETAILED DESCRIPTION OF THE EMBODIMENTS

Figure 1:
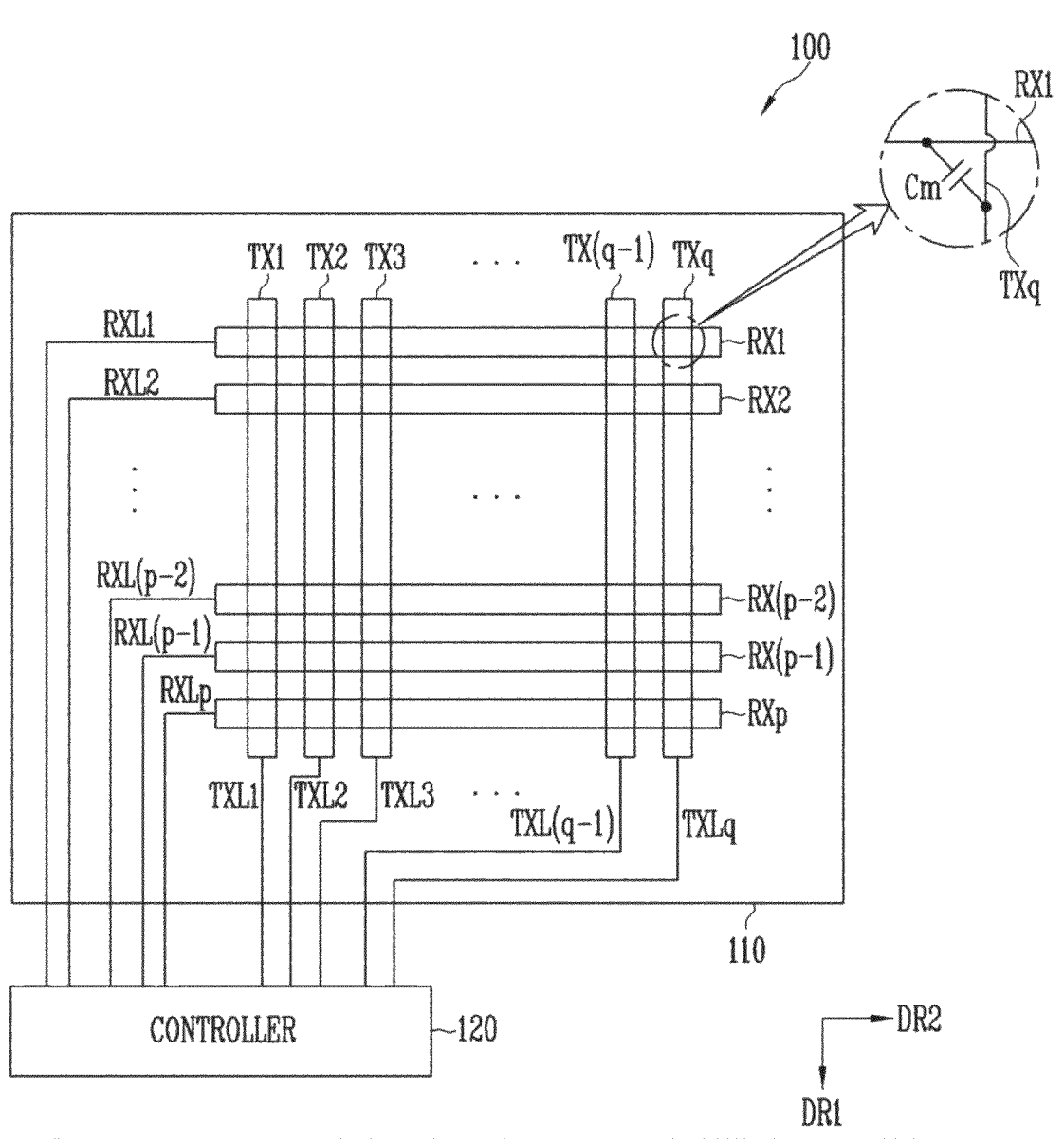
FIG. 1 illustrates a block diagram of a touch sensor according to an embodiment of the present disclosure.

Embodiments of the present disclosure will be described more fully hereinafter with reference to the accompanying drawings. As those skilled in the art would realize, the described embodiments may be modified in various different ways, without departing from the spirit or scope of the present disclosure.

In the drawings, like reference numerals designate like constituent elements throughout the specification.

In addition, terms such as "unit" and "module" used below or functional blocks illustrated in the drawings may be implemented in the form of a software configuration, a hardware configuration, or a combination thereof.

FIG. 1 illustrates a block diagram of a touch sensor according to an embodiment of the present disclosure.

Referring to FIG. 1, a touch sensor 100 may include a touch panel 110 and a controller 120 thereof. The controller 120 may be implemented in hardware as a circuit.

The touch panel 110 may include first touch electrodes and second touch electrodes that form mutual capacitances with the first touch electrodes. The first touch electrodes may be provided as first to q-th scan electrodes TX1, TX2, TX3, . . . , TX(q−1), TXq (q is a positive integer). The second touch electrodes may be provided as first to p-th sensing electrodes RX1, RX2, . . . , RX(p−2), RX(p−1), RXp (p is a positive integer). The first to q-th scan electrodes TX1 to TXq may extend in a first direction DR1, and may be arranged in a second direction DR2. The first to p-th sensing electrodes RX1 to RXp may extend in the second direction DR2, and may be arranged in the first direction DR1. The first to p-th sensing electrodes RX1 to RXp may be electrically separated from the first to q-th scan electrodes TX1 to TXq while intersecting the first to q-th scan electrodes TX1 to TXq, thereby forming mutual capacitances with the first to q-th scan electrodes TX1 to TXq. For example, the first to p-th sensing electrodes RX1 to RXp may be separated from the first to q-th scan electrodes TX1 to TXq by an insulating layer or layers.

In FIG. 1, an equivalent circuit corresponding to a portion in which the first sensing electrode RX1, which is one of the first to p-th sensing electrodes RX1 to RXp, and the q-th scan electrode TXq, which is one of the first to q-th scan electrodes TX1 to TXq, intersect is illustrated. The first sensing electrode RX1 and the q-th scan electrode TXq are electrically separated from each other, and accordingly, a mutual capacitance Cm may be formed between the first sensing electrode RX1 and the q-th scan electrode TXq. In this way, mutual capacitances may be formed in areas in which the first to p-th sensing electrodes RX1 to RXp and the first to q-th scan electrodes TX1 to TXq intersect.

When a user's touch is provided to the touch panel 110, one or more of the mutual capacitances may change. For example, a touch may include at least one of various types of inputs that cause a change in mutual capacitance, such as a user's physical contact and the hovering of the user. The controller 120 may detect such a change in mutual capacitance and recognize a touch.

The controller 120 is connected to the first to q-th scan electrodes TX1 to TXq through first to q-th scan lines TXL1, TXL2, TXL3, . . . , TXL(q−1), TXLq. The controller 120 is connected to the first to p-th sensing electrodes RX1 to RXp through the first to p-th sensing lines RXL1, RXL2, . . . , RXL(p−2), RXL(p−1), RXLp.

The controller 120 may detect sensing signals from the first to p-th sensing electrodes RX1 to RXp through the first to p-th sensing lines RXL1 to RXLp while applying the scan signals to the first to q-th scan electrodes TX1 to TXq through the first to q-th scan lines TXL1 to TXLq. The controller 120 may detect changes in mutual capacitance based on the sensing signals.

In embodiments, the first to q-th scan lines TXL1 to TXLq may be divided into a plurality of scan line groups, and the controller 120 may simultaneously apply scan signals to scan lines included in one scan line group. For example, the controller 120 may use a multi-channel driving method. While this multi-channel driving method reduces the period of one sensing frame, it may cause relatively large EMI due to the simultaneous application of the scan signals.

The simultaneously applied scan signals may be associated with any encoding matrix. The controller 120 may detect the sensing signals through the first to p-th sensing lines RXL1 to RXLp, and may detect a position of a touch by decoding the sensing signals based on a modulation matrix associated with the simultaneously applied scan signals. The modulation matrix may be obtained by encoding the simultaneously applied scan signals.

Figure 2:
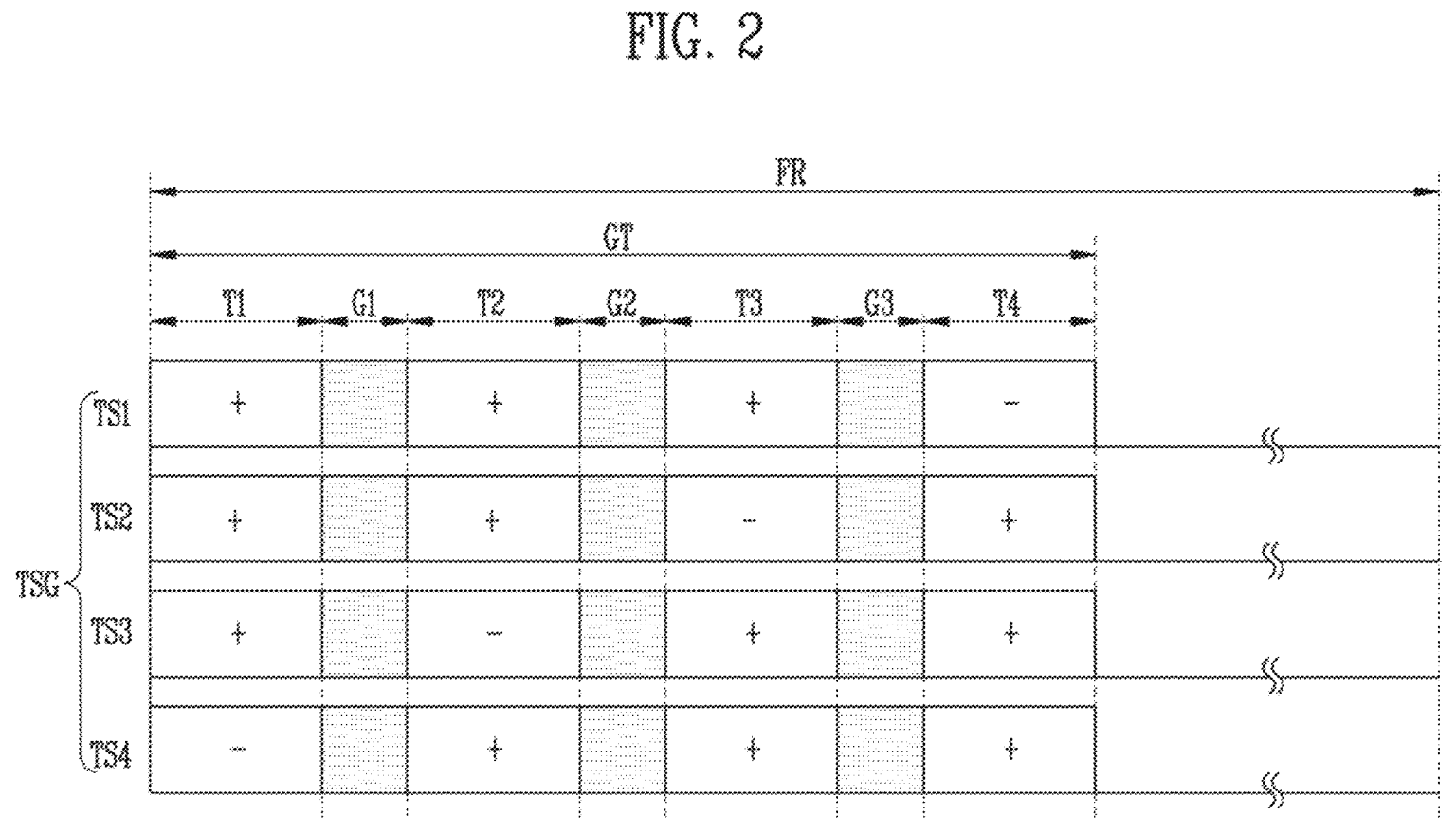

FIG. 2 illustrates a timing diagram of scan signals that may be applied to scan lines of FIG. 1 in one frame. In FIG. 2, first, second, third and fourth scan signals TS1, TS2, TS3 and TS4 respectively applied to the first, second, third and fourth scan lines TXL1, TXL2, TXL3 and TXL4 of the first to q-th scan lines TXL1 to TXLq of FIG. 1 are illustrated as an example.

Referring to FIG. 1 and FIG. 2, the first to q-th scan lines TXL1 to TXLq may be divided into a plurality of scan line groups, and the scan signals applied to the first to q-th scan lines TXL1 to TXLq may also be divided into a plurality of scan signal groups. Within each of group time periods included in a single frame FR, scan signals from a corresponding scan signal group are applied to a specific group of scan lines (e.g., a scan line group).

In FIG. 2, a scan signal group applied in a group time period GT is illustrated as an example. Scan signal groups applied in other group time periods included in the frame FR may be described like that in FIG. 2.

In the group time period GT, the first to fourth scan signals TS1 to TS4 of a scan signal group TSG are applied to the first to fourth scan lines TXL1 to TXL4, respectively. The group time period GT may include first, second, third and fourth time periods T1, T2, T3 and T4 respectively corresponding to the first to fourth scan signals TS1 to TS4, and first, second and third gap periods G1, G2 and G3 respectively corresponding to the first to fourth scan signals TS1 to TS4. For example, the first gap period G1 may be provided between the first and second time periods T1 and T2, the second gap period G2 may be provided between the second and third time periods T2 and T3, and the third gap period G3 may be provided between the third and fourth time periods T3 and T4.

Each scan signal may include a negative unit signal in a time interval corresponding thereto and positive unit signals in other time intervals. In embodiments, as shown in FIG. 2, the first scan signal TS1 may include positive unit signals in the first to third time periods T1 to T3, and may include a negative unit signal in the fourth time period T4. The second scan signal TS2 may include positive unit signals in the first, second, and fourth time periods T1, T2, and T4, and may include a negative unit signal in the third time period T3. The third scan signal TS3 may include positive unit signals in the first, third, and fourth time periods T1, T3, and T4, and may include a negative unit signal in the second time period T2. The fourth scan signal TS4 may include positive unit signals in the second to fourth time periods T2 to T4, and may include a negative unit signal in the first time period T1.

Each of the first to third gap periods G1 to G3 may be a period used to distinguish the first to fourth time periods T1 to T4. For example, the first gap period G1 may divide the first and second time periods T1 and T2, the second gap period G2 may divide the second and third time periods T2 and T3, and the third gap period G3 may divide the third and fourth time periods T3 and T4.

A display driver may output a signal having a constant voltage in each of the first to third gap periods G1 to G3 to distinguish a unit signal included in each of the first to fourth time periods T1 to T4. However, the signal included in each of the first to third gap periods G1 to G3 may include a harmonic component, and thus noise may occur.

Accordingly, the display driver is required to output a signal for distinguishing the unit signal included in each of the first to fourth time periods T1 to T4 without including a harmonic component in each of the first to third gap periods G1 to G3.

Figure 3:
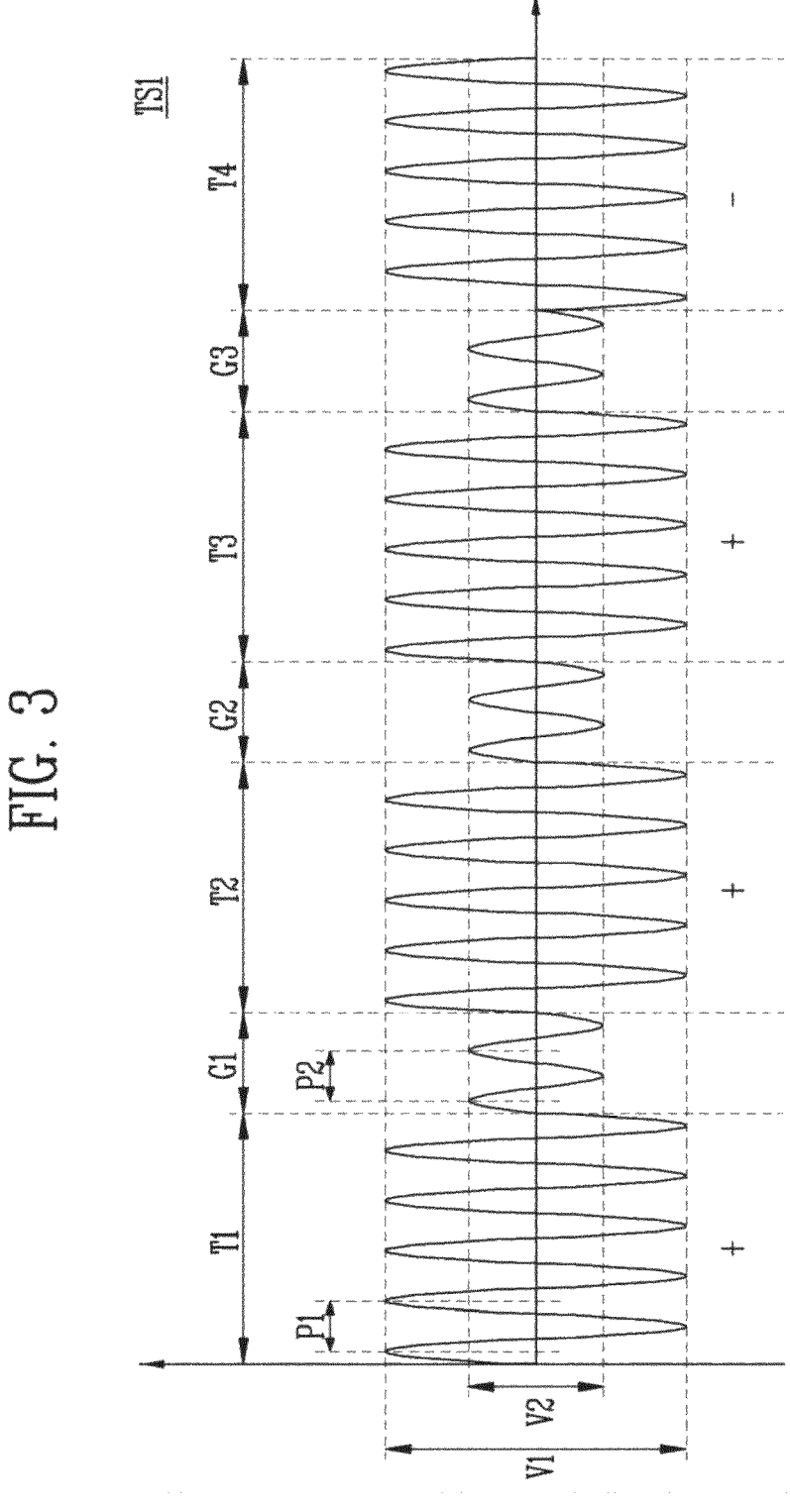
FIG. 3 illustrates a timing diagram of a scan signal according to an embodiment of the present disclosure.
Figure 4A:
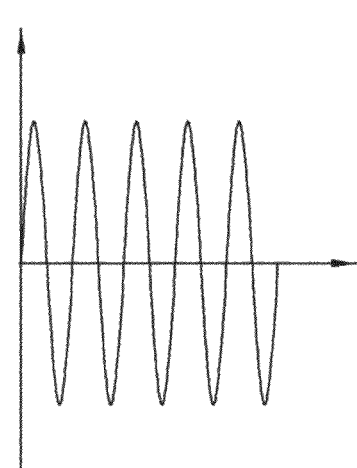
FIG. 4A illustrates a waveform diagram of a first sinusoidal signal of FIG. 3.
Figure 4B:
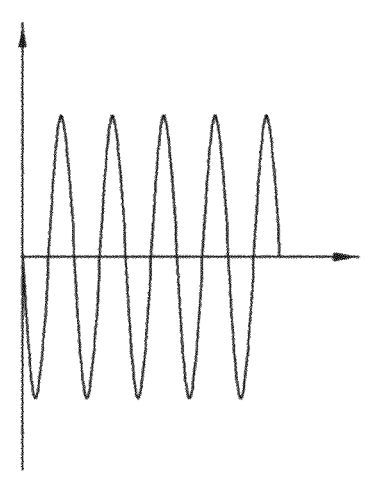
FIG. 4B illustrates a waveform diagram of a second sinusoidal signal of FIG. 3.

FIG. 3 illustrates a timing diagram of a scan signal according to an embodiment of the present disclosure. FIG. 4A illustrates a waveform diagram of a first sinusoidal signal of FIG. 3. FIG. 4B illustrates a waveform diagram of a second sinusoidal signal of FIG. 3.

Referring to FIG. 2 and FIG. 3, the first scan signal TS1 is illustrated.

The first scan signal TS1 may include a plurality of unit signals in the first to fourth time periods T1 to T4. A peak-to-peak value of each of the plurality of unit signals may be a first value V1. A period of each of the plurality of unit signals may be a first period P1.

Each of the plurality of unit signals may include a first sinusoidal signal or a second sinusoidal signal. For example, the first scan signal TS1 may include the first sinusoidal signal in each of the first to third time periods T1 to T3. In other words, each of the first to third time periods T1 to T3 of the first scan signal TS1 may include the same sinusoidal signal. The first scan signal TS1 may include the second sinusoidal signal in the fourth time period T4.

The first sinusoidal signal may be a positive unit signal, and the second sinusoidal signal may be a negative unit signal having a phase opposite to that of the positive unit signal. In FIG. 2 and FIG. 3, a positive unit signal is represented by '+', and a negative unit signal is represented by '−'.

In the embodiment, the first sinusoidal signal may be a sinusoidal signal. The second sinusoidal signal may be a cosine wave signal. For example, the first sinusoidal signal may have a shape as shown in FIG. 4A, and the second sinusoidal signal may have a shape as shown in FIG. 4B.

When the controller (e.g., controller 120 in FIG. 1) decodes the first sinusoidal signal, it may generate a digital code corresponding to a first matrix value. When the controller decodes the second sinusoidal signal, it may generate a digital code corresponding to a second matrix value. For example, the first matrix value may be '+1', and the second matrix value may be '−1'.

The first scan signal TS1 may include a gap signal in each of the first to third gap periods G1 to G3. The peak-to-peak value of the gap signal may be a second value V2. The period of the gap signal may be a second period P2.

In the embodiment, the peak-to-peak value V2 of the gap signal may be smaller than the peak-to-peak value V1 of the unit signal. An amplitude value of the gap signal may be smaller than an amplitude value of the unit signal. The period P2 of the gap signal may be the same as the period P1 of the unit signal. A frequency of the gap signal may be the same as a frequency of the unit signal. For example, the gap signal may be a sinusoidal signal having the same frequency as the unit signal and an amplitude smaller than the amplitude of the unit signal.

Since the frequency of the gap signal is the same as the frequency of the unit signal, the first scan signal TS1 may have one frequency component. In other words, the first scan signal TS1 may have a single frequency component. For example, the display driver may output a signal for distinguishing the unit signal included in each of the first to fourth time periods T1 to T4 without including a harmonic component in each of the first to third gap periods G1 to G3. Accordingly, the occurrence of EMI may be reduced.

In addition, since the amplitude value of the gap signal is smaller than the amplitude value of the unit signal, the power consumption of the display device may be reduced.

Although the first scan signal TS1 is described in FIG. 3, the present disclosure is not limited thereto, and the scan signals applied to the other scan lines may also be described like that in FIG. 3.

Figure 5:
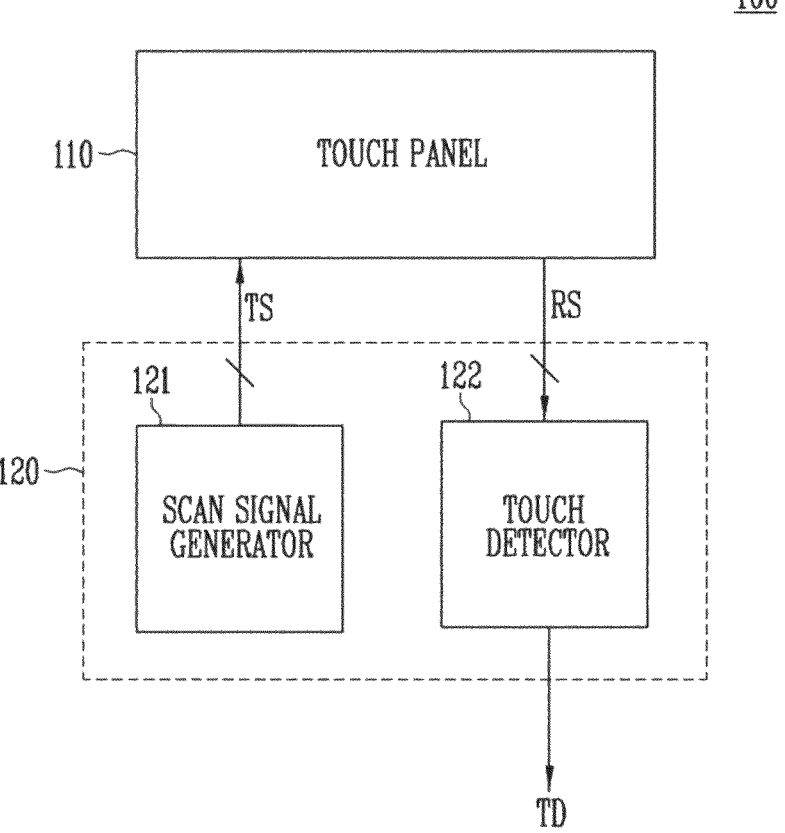
FIG. 5 illustrates a block diagram of a touch sensor of FIG. 1.

FIG. 5 illustrates a block diagram of a touch sensor of FIG. 1.

Referring to FIG. 5, the controller 120 may include a scan signal generator 121 and a touch detector 122. As elements of the controller 120, the scan signal generator 121 and the touch detector 122 may be implemented in hardware as a circuit. Hereinafter, the touch panel 110 and the controller 120 of FIG. 5 may be described similarly to the touch panel 110 and the controller 120 of FIG. 1, and redundant descriptions thereof will be simplified or omitted.

The scan signal generator 121 is connected to the first to q-th scan lines TXL1 to TXLq of FIG. 1, and is configured to apply the scan signals TS to the first to q-th scan electrodes TX1 to TXq of FIG. 1 through the first to q-th scan lines TXL1 to TXLq. The first to q-th scan lines TXL1 to TXLq may be grouped into a plurality of scan line groups, and the scan lines of each scan line group may be substantially simultaneously driven. The scan signals applied to each scan line group are similarly provided like the first to fourth scan signals TS1 to TS4 in FIG. 2.

In some embodiments, the scan signal generator 121 may apply the first scan signal TS1 including the first to fourth time periods T1 to T4 and the first to third gap periods G1 to G3 to the first scan line TXL1.

The touch detector 122 is connected to the first to p-th sensing lines RXL1 to RXLp of FIG. 1, and is configured to receive sensing signals RS from the first to p-th sensing electrodes RX1 to RXp of FIG. 1 through the first to p-th sensing lines RXL1 to RXLp. The touch detector 122 may generate touch data TD according to the sensing signals RS. The touch detector 122 may detect the position of a touch by decoding the sensing signals RS.

In the embodiment, the touch detector 122 may distinguish whether a target signal among the sensing signals RS corresponds to a unit signal or a gap signal. For example, the target signal may be one of the unit signals included in the first to fourth time periods T1 to T4 of FIG. 3 and the gap signals included in the first to third gap periods G1 to G3 of FIG. 3.

The touch detector 122 may calculate a characteristic value of the target signal. For example, the characteristic value may include an amplitude value, a frequency value, and a peak-to-peak value.

In the embodiment, the touch detector 122 may calculate the amplitude value of the target signal. When the amplitude value is greater than a first reference value, the touch detector 122 may determine that the target signal corresponds to the unit signal. When the amplitude value is less than or equal to the first reference value, the touch detector 122 may determine that the target signal corresponds to the gap signal.

When the touch detector 122 determines that the target signal corresponds to the unit signal, the touch detector 122 may decode the unit signal to generate a digital code. For example, when the target signal is the unit signal included in the first time period T1 of FIG. 3, the touch detector 122 may decode the target signal to generate a digital code having the first matrix value ('+1'). When the target signal is the unit signal included in the fourth time period T4 of FIG. 3, the touch detector 122 may decode the target signal to generate a digital code having the second matrix value ('−1').

When the target signal corresponds to the gap signal, the touch detector 122 may determine whether the target signal received after the currently received target signal corresponds to the unit signal or the gap signal.

For example, when the target signal is the gap signal included in the first gap period G1 of FIG. 3, the touch detector 122 may determine whether the signal included in the second time period T2 after the first gap period G1 corresponds to the unit signal or the gap signal.

Figure 6:
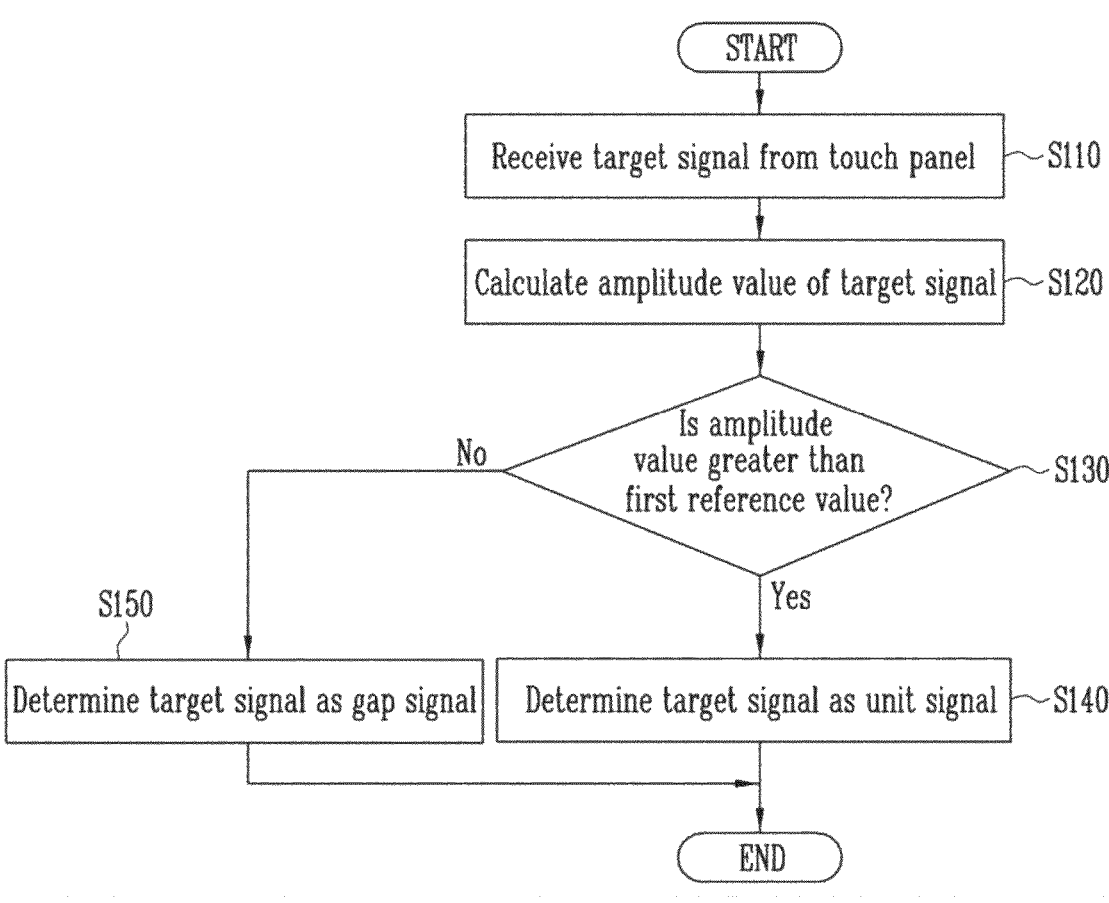
FIG. 6 illustrates a flowchart of a method for operating a controller according to an embodiment of the present disclosure.

FIG. 6 illustrates a flowchart of a method for operating a controller according to an embodiment of the present disclosure. Referring to FIG. 5 and FIG. 6, a method of operating the controller 120 is illustrated.

In step S110, the controller 120 may receive a target signal from the touch panel 110. The target signal may be one of the unit signal included in each of the first to fourth time periods T1 to T4 of FIG. 3 and the gap signal included in each of the first to third gap periods G1 to G3 of FIG. 3.

In step S120, the controller 120 may calculate the amplitude value of the target signal.

In step S130, the controller 120 may determine whether the amplitude value is greater than the first reference value. When the amplitude value is greater than the first reference value, the controller 120 may perform step S140. When the amplitude value is less than or equal to the first reference value, the controller 120 may perform step S150.

In step S140, the controller 120 may determine that the target signal corresponds to the unit signal. In other words, the controller 120 may determine that the target signal is the unit signal. In the embodiment, the controller 120 may generate a digital code by decoding the target signal determined to correspond to the unit signal.

In step S150, the controller 120 may determine that the target signal corresponds to the gap signal. In other words, the controller 120 may determine that the target signal is the gap signal. In the embodiment, when it is determined that the target signal corresponds to the gap signal, the controller 120 may determine whether the target signal received after the currently received target signal corresponds to the unit signal or the gap signal.

Figure 7:
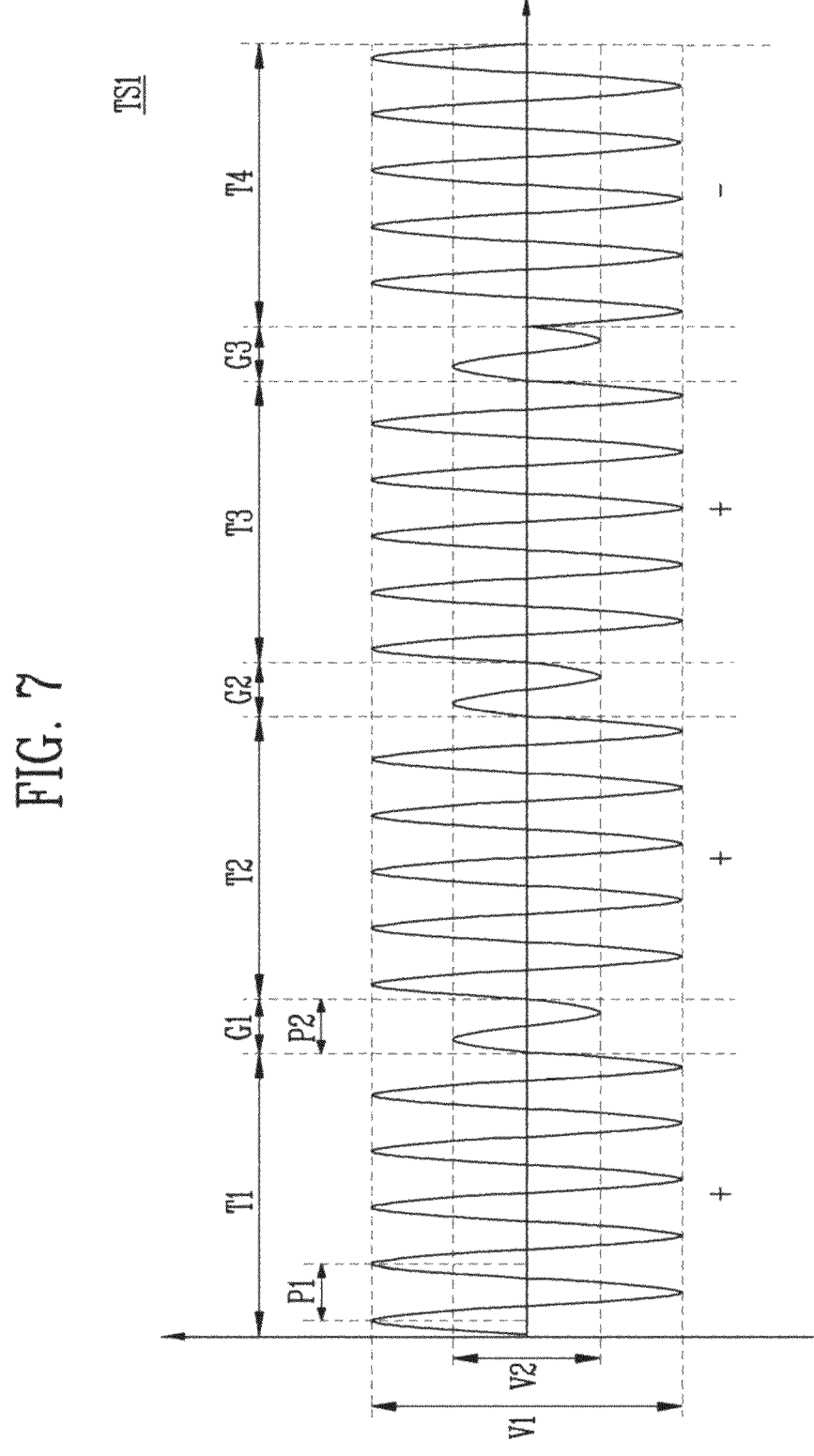
FIG. 7 illustrates a timing diagram of a scan signal according to an embodiment of the present disclosure.

FIG. 7 illustrates a timing diagram of a scan signal according to an embodiment of the present disclosure. Referring to FIG. 2 and FIG. 7, the first scan signal TS1 is illustrated.

The first scan signal TS1 may include a plurality of unit signals in the first to fourth time periods T1 to T4. A peak-to-peak value of each of the plurality of unit signals may be a first value V1. A period of each of the plurality of unit signals may be a first period P1. The plurality of unit signals in FIG. 7 may be described similarly to the plurality of unit signals in FIG. 3, so redundant descriptions thereof will be simplified or omitted.

The first scan signal TS1 may include a gap signal in each of the first to third gap periods G1 to G3. A gap signal may be provided between the first and second time periods T1 and T2, between the second and third time periods T2 and T3 and between the third and fourth time periods T3 and T4. The peak-to-peak value of the gap signal may be a second value V2. The period of the gap signal may be a second period P2.

In FIG. 7, although the peak-to-peak value V2 of the gap signal is illustrated to be smaller than the peak-to-peak value V1 of the unit signal, the present disclosure is not limited thereto. For example, the peak-to-peak value V2 of the gap signal may be greater than or equal to the peak-to-peak value V1 of the unit signal.

The period P2 of the gap signal may be different from the period P1 of the unit signal. The frequency of the gap signal may be different from the frequency of the unit signal.

In the embodiment, the touch detector 122 of FIG. 5 may distinguish whether a target signal among the sensing signals RS corresponds to a unit signal or a gap signal. For example, the target signal may be one of the unit signals included in the first to fourth time periods T1 to T4 of FIG. 7 and the gap signals included in the first to third gap periods G1 to G3 of FIG. 7.

In the embodiment, the touch detector 122 may calculate the frequency value of the target signal. When the frequency value is the second reference value, the touch detector 122 may determine that the target signal corresponds to the unit signal. When the frequency value is not the second reference value, the touch detector 122 may determine that the target signal corresponds to the gap signal.

Figure 8:
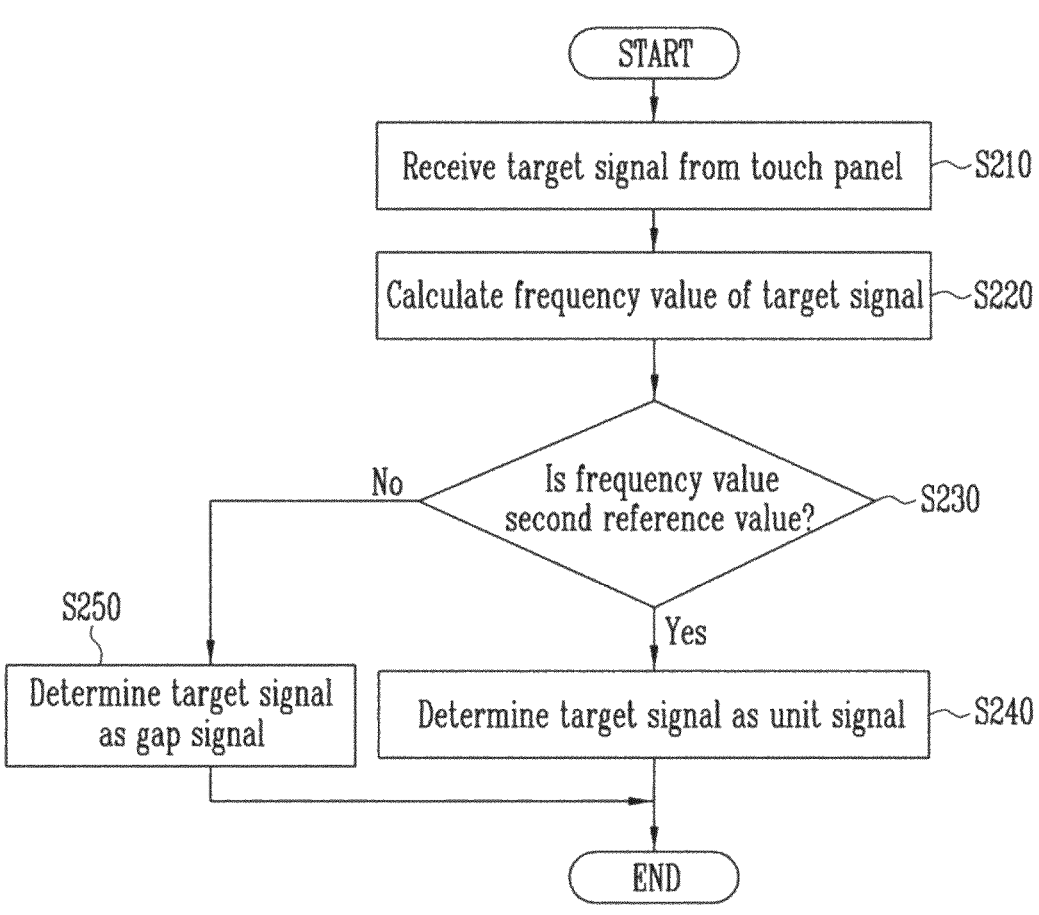
FIG. 8 illustrates a flowchart of a method for operating a controller according to an embodiment of the present disclosure.

FIG. 8 illustrates a flowchart of a method for operating a controller according to an embodiment of the present disclosure.

Referring to FIG. 8, a method of operating the controller 120 is illustrated.

In step S210, the controller 120 may receive a target signal from the touch panel 110. The target signal may be one of the unit signal included in each of the first to fourth time periods T1 to T4 of FIG. 7 and the gap signal included in each of the first to third gap periods G1 to G3 of FIG. 7.

In step S220, the controller 120 may calculate the frequency value of the target signal.

In step S230, the controller 120 may determine whether the frequency value is a second reference value. When the frequency value is the second reference value, the controller 120 may perform step S240. When the frequency value is not the second reference value, the controller 120 may perform step S250.

In step S240, the controller 120 may determine that the target signal corresponds to the unit signal. In the embodiment, the controller 120 may generate a digital code by decoding the target signal determined to correspond to the unit signal.

In step S250, the controller 120 may determine that the target signal corresponds to the gap signal. In the embodiment, when it is determined that the target signal corresponds to the gap signal, the controller 120 may determine whether the target signal received after the currently received target signal corresponds to the unit signal or the gap signal.

FIG. 9 to FIG. 15 are drawings for explaining a configuration of a display device for use with embodiments of the present disclosure. Reference numerals of FIG. 9 to FIG. 15 and the reference numerals of FIG. 1 to FIG. 8 are independent of each other.

Figure 9:
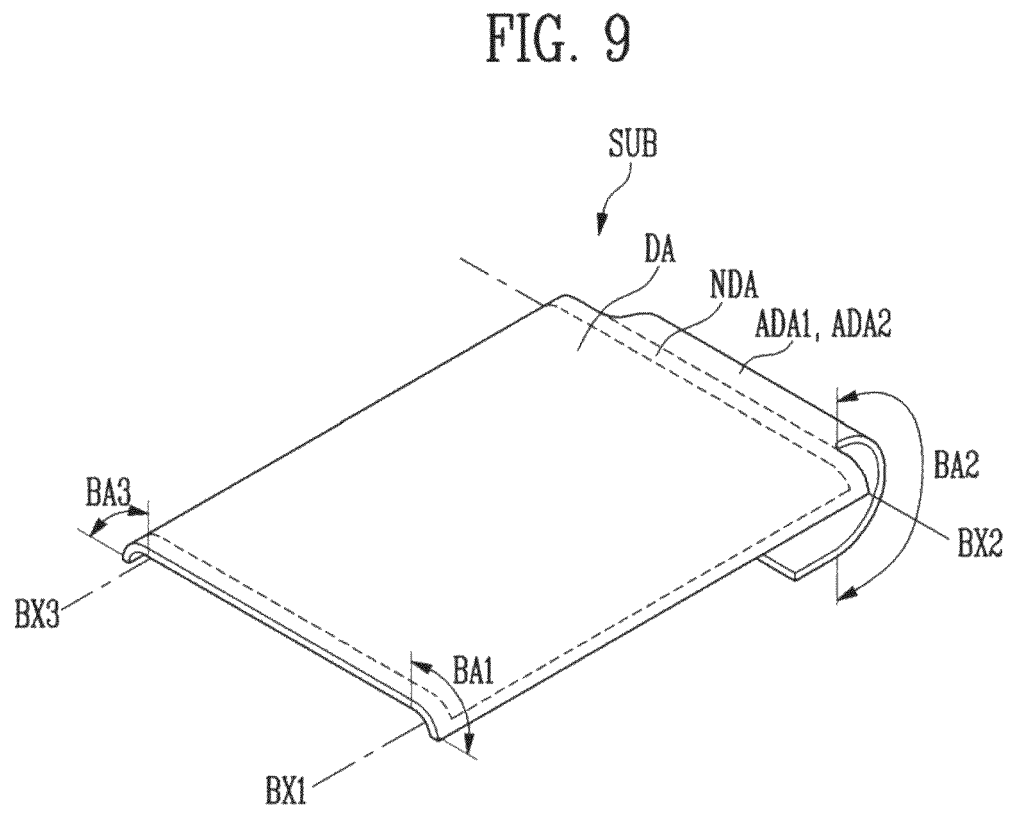
Figure 10:
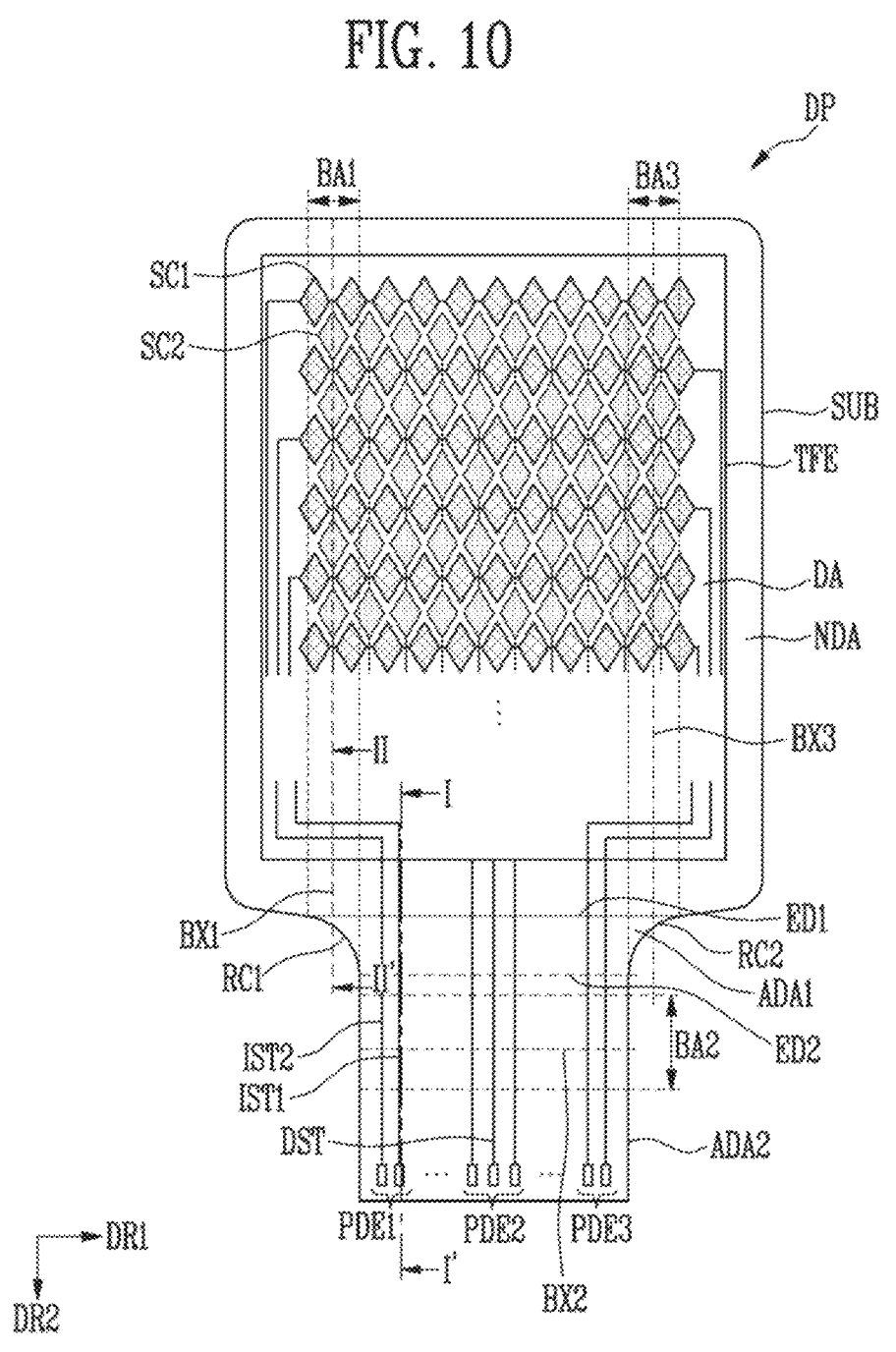

FIG. 9 illustrates a substrate according to an embodiment of the present disclosure, and FIG. 10 illustrates a display device according to an embodiment of the present disclosure.

In the following embodiments, a position of a plane may be defined by the first direction DR1 (see FIG. 10) and the second direction DR2 (see FIG. 10), and a position of a height may by defined by the third direction DR3 (see FIG. 11). The first direction DR1, the second direction DR2, and third direction DR3 may be directions orthogonal to each other.

A substrate SUB may include a display area DA, a non-display area NDA, a first additional area ADA1, and a second additional area ADA2.

The display area DA may have a rectangular shape. Each corner of the display area DA may have an angled shape or a curved shape. In addition, in a circular display, the display area DA may have a circular shape. In addition, the display area DA may have a polygonal shape other than a quadrangular shape and an elliptical shape. As such, the shape of the display area DA may be differently set depending on a product, for example.

Pixels may be disposed in the display area DA. Depending on a type of the display device DP, respective pixels may include a light emitting diode or a liquid crystal layer.

The non-display area NDA may surround a periphery of the display area DA. For example, the non-display area NDA may have a rectangular shape. Each corner of the non-display area NDA may have an angled shape or a curved shape. FIG. 9 illustrates a case in which each corner of the non-display area NDA has a curved shape. FIG. 9 also illustrates the case where opposite sides of the non-display area NDA are bent. The non-display area NDA may have a circular shape. A shape of the non-display area NDA may be similar to that of the display area DA.

The first additional area ADA1 may be disposed between the non-display area NDA and the second additional area ADA2. The first additional area ADA1 may be connected to the non-display area NDA at a first boundary ED1. The first additional area ADA1 may be connected to the second additional area ADA2 at a second boundary ED2. The first boundary ED1 and the second boundary ED2 may extend in the first direction DR1, respectively.

A width of the first additional area ADA1 may become narrower from the first boundary ED1 to the second boundary ED2. In other words, the width of the first additional area ADA1 in the first direction DR1 may become narrower toward the second direction DR2. Accordingly, the first additional area ADA1 may include curved first and second lateral surfaces RC1 and RC2. The lateral surfaces RC1 and RC2 may be convex toward the inside of the substrate SUB (for example, a center of the substrate SUB).

In FIG. 10, the first additional area ADA1 is illustrated to include two lateral surfaces RC1 and RC2 in the first direction DR1 and an opposite direction thereof. In another embodiment, the first additional area ADA1 may include only the first lateral surface RC1 because the boundary positioned in the first direction DR1 coincides with the boundary of the non-display area NDA. In another embodiment, the first additional area ADA1 may include only the second lateral surface RC2 because the boundary positioned in the opposite direction of the first direction DR1 coincides with the boundary of the non-display area NDA.

The second additional area ADA2 may have a rectangular shape. Each corner positioned in the second direction DR2 of the second additional area ADA2 may have an angled shape or a curved shape. FIG. 10 illustrates a case in which each corner positioned in the second direction DR2 of the second additional area ADA2 has an angled shape.

An encapsulation film TFE may be disposed on the pixels. For example, the encapsulation film TFE may cover the pixels in the display area DA, and a boundary of the encapsulation film TFE may be disposed in the non-display area NDA. The encapsulation film TFE covers the light emitting elements and the circuit elements of the pixels of the display area DA, thereby preventing damage from external moisture or impact.

Sensing electrodes SC1 and SC2 may be disposed on the encapsulation film TFE. The sensing electrodes SC1 and SC2 may detect a touch, hovering, gesture, proximity, or the like by the user's body. The sensing electrodes SC1 and SC2 have different shapes depending on the type of sensing electrode employed, including, but not limited to a resistive type, a capacitive type, an electro-magnetic (EM) type, and an optical type. For example, when the sensing electrodes SC1 and SC2 are configured in a capacitive type, the sensing electrodes SC1 and SC2 may be configured in a self-capacitive type or a mutual-capacitive type. Hereinafter, for better understanding and ease of description, a case in which the sensing electrodes SC1 and SC2 are configured in a mutual-capacitance type will be described as an example.

When the sensing electrodes SC1 and SC2 are configured in a mutual capacitance type, a driving signal is transmitted through a sensing wire corresponding to the first sensing electrode SC1, and a sensing signal may be received through a sensing wire corresponding to the second sensing electrode SC2 forming a mutual capacitance with the first sensing electrode SC1. When the user's body approaches, the mutual capacitance between the first sensing electrode SC1 and the second sensing electrode SC2 may be changed, and depending on a difference between the sensing signals, the user's touch may be detected. In another embodiment, a driving signal is transmitted through a sensing wire corresponding to the second sensing electrode SC2, and a sensing signal may be received through a sensing wire corresponding to the first sensing electrode SC1 forming a mutual capacitance with the second sensing electrode SC2. When the user's body approaches, the mutual capacitance between the first sensing electrode SC1 and the second sensing electrode SC2 may be changed, and depending on a difference between the sensing signals, the user's touch may be detected.

Pads PDE1, PDE2, and PDE3 may be disposed in the second additional area ADA2. The pads PDE1 and PDE3 may be connected to the sensing electrodes SC1 and SC2 disposed on the encapsulation film TFE through sensing wires IST1 and IST2. The pads PDE1 and PDE3 may be connected to an external touch integrated chip (IC). In addition, the pads PDE2 may be connected to pixels or a driver of the pixels disposed under the encapsulation film TFE through display wires DST. The pads PDE2 may be disposed between the pads PDE1 and PDE3. The driver may include a scan driver, a light emitting driver, a data driver, and the like. The driver may be disposed under the encapsulation film TFE, or may be disposed on an external display IC connected to the display device DP through the pads PDE2.

When the display device DP is a mutual capacitance type, the touch IC may transmit a driving signal through the first sensing wire IST1, and may receive a sensing signal through the second sensing wire IST2. In another embodiment, the driving signal may be transmitted through the second sensing wire IST2, and the sensing signal may be received through the first sensing wire IST1. For reference, when the display device DP is a self-capacitance type, there may be no difference in driving methods of the first sensing wire IST1 and the second sensing wire IST2. Display wires DST may include a control line, a data line, a power line, etc., and may provide signals so that the pixels may display an image. These signals may be provided from a driver connected to the display wires DST.

FIG. 9 illustrates a state in which the substrate SUB is bent, and FIG. 10 illustrates a state in which the substrate SUB is not bent.

The display device DP may be bent as shown in FIG. 9 after elements are stacked on the substrate SUB in a state that is not bent as shown in FIG. 10.

The substrate SUB may include a first bending area BA1 extending from the first lateral surface RC1 of the first additional area ADA1 to overlap the non-display area NDA. Additionally, the first bending area BA1 may extend to overlap the display area DA. For example, each of the display area DA, the non-display area NDA, and the first additional area ADA1 may partially overlap the first bending area BA1. The first bending area BA1 may have a width in the first direction DR1, and may extend lengthwise in the second direction DR2. A first bending axis BX1 may be referred to a folding line extending from a center of the first bending area BA1 in the second direction DR2. In some embodiments, the first bending area BA1 may be a portion in which a stress is reduced by removing a portion of an insulating film thereof, unlike other portions of the display device DP in the vicinity of the first bending area BA1. In some embodiments, the first bending area BA1 may have the same configuration as other portions around it.

The substrate SUB may include a third bending area BA3 extending from the second lateral surface RC2 of the first additional area ADA1 to overlap the non-display area NDA. Additionally, the third bending area BA3 may extend to overlap the display area DA. For example, each of the display area DA, the non-display area NDA, and the first additional area ADA1 may partially overlap the third bending area BA3. The third bending area BA3 may have a width in the first direction DR1, and may extend lengthwise in the second direction DR2. A third bending axis BX3 may be referred to a folding line extending from a center of the third bending area BA3 in the second direction DR2. In some embodiments, the third bending area BA3 may be a portion in which a stress is reduced by removing a portion of an insulating film thereof, unlike other portions of the display device DP in the vicinity of the third bending area BA3. In some embodiments, the third bending area BA3 may have the same configuration as other portions around it.

The second additional area ADA2 may include a second bending area BA2. The second bending area BA2 may have a width in the second direction DR2, and may extend lengthwise in the first direction DR1. A second bending axis BX2 may be referred to a folding line extending from a center of the second bending area BA2 in the first direction DR1. In some embodiments, the second bending area BA2 may be a portion in which a stress is reduced by removing a portion of an insulating film thereof, unlike other portions of the display device DP in the vicinity of the second bending area BA2. In some embodiments, the second bending area BA2 may have the same configuration as other portions around it.

The first to third bending areas BA1, BA2, and BA3 may not overlap each other.

Herein, the term "folded" means that a shape is not fixed, but an original shape may be changed to another shape, and the shape is folded, curved, or rolled along one or more bending axes. For example, the shape of the display area DA may be folded along one or more bending axes. By the first and third bending areas BA1 and BA3, a width of the side bezel of the opposite direction of the first direction DR1 of the display device DP and a width of the side bezel of the first direction DR1 of the display device DP may be reduced. In addition, a width of the side bezel of the second direction DR2 of the display device DP may be reduced by the second bending area BA2.

Figure 11:
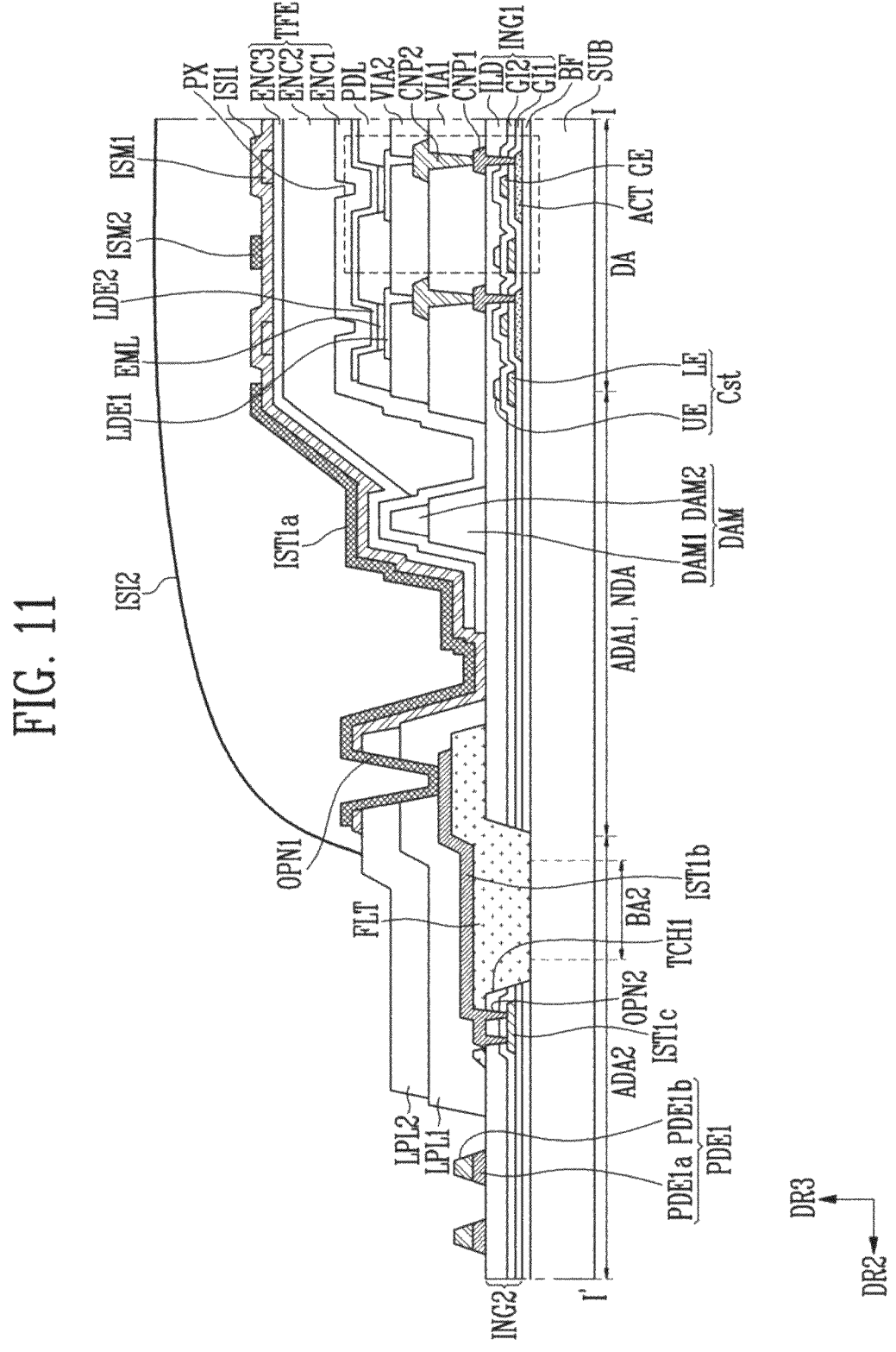

FIG. 11 illustrates a cross-sectional view taken along line I-I' of FIG. 10. It is assumed that line I-I' in FIG. 10 passes through the first pad PDE1 and the first sensing wire IST1.

First, the display area DA will be described. In the embodiment, pixels PX are provided in the display area DA. Each pixel PX may include a transistor connected to a corresponding wire among the display wires DST, a light emitting element connected to the transistor, and a capacitor Cst. In FIG. 11, for better understanding and ease of description, one transistor, one light emitting element, and one capacitor Cst are illustrated as an example for one pixel PX.

The substrate SUB may be made of an insulating material such as glass or a resin. In addition, the substrate SUB may be made of a flexible material to be bendable or foldable, and may have a single-layered structure or a multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material included in the substrate SUB may be variously changed, and may also include fiber reinforced plastic (FRP).

For example, when the substrate SUB has a multi-layered structure, inorganic materials such as a silicon nitride, a silicon oxide, and a silicon oxynitride may be interposed between a plurality of layers in a single layer or in a plurality of layers.

A buffer film BF may cover the substrate SUB. The buffer film BF may prevent impurities from diffusing into a channel of the transistor. The buffer film BF may be an inorganic insulating film made of an inorganic material. For example, the buffer film BF may be made of a silicon nitride, a silicon oxide, a silicon oxynitride, or the like, and may be omitted depending on the materials and the process conditions of the substrate SUB. In some embodiments, a barrier layer may be further provided.

An active film ACT may be disposed on the buffer film BF. The active film ACT may be patterned to form a channel, a source electrode, and a drain electrode of a transistor, or to form a wire. The active film ACT may be made of a semiconductor material. The active film ACT may be a semiconductor pattern made of polysilicon, amorphous silicon, or an oxide semiconductor. The channel of the transistor is a semiconductor pattern that is not doped with an impurity, and may be an intrinsic semiconductor. The source electrode, the drain electrode, and the wire may be a semiconductor pattern doped with an impurity. An N-type impurity, a P-type impurity, and other impurities such as metal may be used as the impurity.

A first gate insulating film GI1 may cover the active film ACT. The first gate insulating film GI1 may be an inorganic insulating film made of an inorganic material. As the inorganic material, an inorganic insulating material such as polysiloxane, a silicon nitride, a silicon oxide, or a silicon oxynitride may be used.

A gate electrode GE of the transistor and a lower electrode LE of the capacitor Cst may be disposed on the first gate insulating film GI1. The gate electrode GE may overlap an area corresponding to the channel of the transistor.

The gate electrode GE and the lower electrode LE may be made of metal. For example, the gate electrode GE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the gate electrode GE may be formed as a single film, but is not limited thereto, and may be formed as a multi-film in which two or more materials among metals and alloys are stacked.

A second gate insulating film GI2 may cover the gate electrode GE and the lower electrode LE. The second gate insulating film GI2 may be an inorganic insulating film made of an inorganic material. As the inorganic material, a polysiloxane, a silicon nitride, a silicon oxide, or a silicon oxynitride may be used.

An upper electrode UE of the capacitor Cst may be disposed on the second gate insulating film GI2. The upper electrode UE of the capacitor Cst may be made of metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the upper electrode UE may be formed as a single film, but is not limited thereto, and may be formed as a multi-film in which two or more materials among metals and alloys are stacked.

The lower electrode LE and the upper electrode UE may configure the capacitor Cst with the second gate insulating film GI2 interposed therebetween. In FIG. 11, the capacitor Cst is shown to have a two-layered electrode structure of the lower electrode LE and the upper electrode UE, but in another embodiment, the capacitor Cst may have a three-layered electrode structure by using the active film ACT, or may have a three-layer electrode structure or a four or more layered structure by using an electrode of the same layer as a first connection pattern CNP1.

An interlayer insulating film ILD may cover the upper electrode UE. The interlayer insulating film ILD may be an inorganic insulating film made of an inorganic material. As the inorganic material, a polysiloxane, a silicon nitride, a silicon oxide, or a silicon oxynitride may be used.

For better understanding and ease of description in the present embodiment, the first gate insulating film GI1, the second gate insulating film GI2, and the interlayer insulating film ILD may be referred to as a first insulating film group ING1. The first insulating film group ING1 may cover a portion of the transistor. In some embodiments, the first insulating film group ING1 may further include the buffer film BF.

The first connection pattern CNP1 may be disposed on the interlayer insulating film ILD. The first connection pattern CNP1 may contact a source electrode and a drain electrode of the active film ACT through contact holes formed in the interlayer insulating film ILD, the second gate insulating film GI2, and the first gate insulating film GI1, respectively.

The first connection pattern CNP1 may be made of metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

In some embodiments, a passivation film may cover the first connection pattern CNP1. The passivation film may be an inorganic insulating film made of an inorganic material. As the inorganic material, a polysiloxane, a silicon nitride, a silicon oxide, or a silicon oxynitride may be used.

A first via film VIA1 may cover the passivation film or the transistor. The first via film VIA1 may contact the first connection pattern CNP1. The first via film VIA1 may be an organic insulating film made of an organic material. As the organic material, an organic insulating material such as a polyacryl-based compound, a polyimide-based compound, a fluorine-based carbon compound such as Teflon, and a benzocyclobutene compound may be used. The organic insulating film may be deposited by a method such as evaporation.

A second connection pattern CNP2 may be connected to the first connection pattern CNP1 through an opening of the first via film VIA1. The second connection pattern CNP2 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

A second via film VIA2 may cover the first via film VIA1 and the second connection pattern CNP2. The second via film VIA2 may be an organic insulating film made of an organic material. As the organic material, an organic insulating material such as a polyacryl-based compound, a polyimide-based compound, a fluorine-based carbon compound such as Teflon, and a benzocyclobutene compound may be used.

A first light emitting element electrode LDE1 may be connected to the second connection pattern CNP2 through an opening of the second via film VIA2. Here, the first light emitting element electrode LDE1 may be an anode of the light emitting element in some embodiments.

In some embodiments, the configuration of the second via film VIA2 and the second connection pattern CNP2 may be omitted, and the first light emitting element electrode LDE1 may be directly connected to the first connection pattern CNP1 through the opening of the first via film VIA1.

The first light emitting element electrode LDE1 may be made of a metal film such as Ag, Mg, Al, Pt, Pd, Au, Ni, Nd, Ir, Cr, and an alloy thereof and/or an indium tin oxide (ITO), an indium zinc oxide (IZO), a zinc oxide (ZnO), and indium tin zinc oxide (ITZO). The first light emitting element electrode LDE1 may be made of one type of metal, but is not limited thereto, and may be made of two or more types of metals, for example, an alloy of Ag and Mg.

The first light emitting element electrode LDE1 may be formed of a transparent conductive film when an image is to be provided in a lower direction of the substrate SUB. Additionally, the first light emitting element electrode LDE1 may be formed of a metal reflective film and/or a transparent conductive film when an image is to be provided in an upper direction of the substrate SUB.

A pixel defining film PDL partitioning a light emitting area of each pixel PX is provided on the substrate SUB on which the first light emitting element electrode LDE1 is formed. The pixel defining film PDL may be an organic insulating film made of an organic material. As the organic material, an organic insulating material such as a polyacryl-based compound, a polyimide-based compound, a fluorine-based carbon compound such as Teflon, and a benzocyclobutene compound may be used.

The pixel defining film PDL may expose an upper surface of the first light emitting element electrode LDE1, and may protrude from the substrate SUB along a circumference of the pixel PX. A light emitting film EML may be provided in an area of the pixel PX surrounded by the pixel defining film PDL.

The light emitting film EML may include a low-molecular or high-molecular material. The low-molecular material may include a copper phthalocyanine (CuPc), N,N'-Di (naphthalene-1-yl)-N,N'-diphenyl-benzidine (NPB), tris-8-hydroxyquinoline aluminum(Alq3), and the like. These materials may be formed by a method of vacuum deposition.

The high-molecular material may include PEDOT, a poly-phenylenevinylene (PPV)-based material, and a polyfluorene-based material.

The light emitting film EML may be provided as a single layer, or may be provided as a multilayer including various functional layers. When the light emitting film EML is provided as a multilayer, it may have a structure in which a hole injection layer, a hole transport layer, an emission layer, an electron transport layer, and an electron injection layer are stacked in a single or complex structure. Such a light emitting film EML may be formed by a screen printing method, an inkjet printing method, or a laser induced thermal imaging method (LITI).

In some embodiments, at least a portion of the light emitting film EML may be integrally formed on a plurality of first light emitting element electrodes LDE1. Additionally, the light emitting film EML may be individually provided to correspond to each of the plurality of first light emitting element electrodes LDE1.

A second light emitting element electrode LDE2 may be provided on the light emitting film EML. The second light emitting element electrode LDE2 may be provided for each pixel PX, but may also cover most of the display area DA, and may be shared by a plurality of pixels PX.

In some embodiments, the second light emitting element electrode LDE2 may be used as a cathode or an anode. For example, when the first light emitting element electrode LDE1 is an anode, the second light emitting element electrode LDE2 may be used as a cathode, and when the first light emitting element electrode LDE1 is a cathode, the second light emitting element electrode LDE2 may be used as an anode.

The second light emitting element electrode LDE2 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO). In the embodiment of the present disclosure, the second light emitting element electrode LDE2 may be formed of a multi-film of a double film or more including a metal thin film. For example, the second light emitting element electrode LDE2 may be formed of a triple-film of ITO/Ag/ITO.

The second light emitting element electrode LDE2 may be formed of a metal reflective film and/or a transparent conductive film when an image is to be provided in a lower direction of the substrate SUB, and it may be formed of a transparent conductive film when an image is to be provided in an upper direction of the substrate SUB.

A set of the first light emitting element electrode LDE1, the light emitting film EML, and the second light emitting element electrode LDE2 described above may be referred to as a light emitting element.

The encapsulation film TFE may be provided on the second light emitting element electrode LDE2. The encapsulation film TFE may be formed as a single layer, but may also be formed as a multilayer. In the present embodiment, the encapsulation film TFE may include first, second and third encapsulation films ENC1, ENC2, and ENC3. The first to third encapsulation films ENC1, ENC2, and ENC3 may be made of an organic material and/or an inorganic material. The third encapsulation film ENC3 disposed at the outermost portion of the display device DP may be made of an inorganic material. For example, the first encapsulation film ENC1 may be an inorganic film made of an inorganic material, the second encapsulation film ENC2 may be an organic film made of an organic material, and the third encapsulation film ENC3 may be an inorganic film made of an inorganic material. The inorganic material has less penetration of moisture and oxygen than the organic material, but is vulnerable to cracks due to its low elasticity or flexibility. Propagation of cracks may be prevented by forming the first encapsulation film ENC1 and the third encapsulation film ENC3 with an inorganic material and forming the second encapsulation film ENC2 with an organic material. Here, the layer made of the organic material, for example, the second encapsulation film ENC2 may be completely covered by the third encapsulation film ENC3 so that an end portion thereof is not exposed to the outside. As the organic material, an organic insulating material such as a polyacryl-based compound, a polyimide-based compound, a fluorine-based carbon compound such as Teflon, or a benzocyclobutene compound may be used, and as the inorganic material, a polysiloxane, a silicon nitride, a silicon oxide, or a silicon oxynitride may be used.

The light emitting film EML forming the light emitting element may be easily damaged by moisture or oxygen from the outside. The encapsulation film TFE protects the light emitting film EML by covering the light emitting film EML. The encapsulation film TFE covers the display area DA, and may extend to the non-display area NDA outside the display area DA. However, although the insulating films made of an organic material are flexible and elastic, they allow moisture and oxygen to permeate more easily than the insulating film made of an inorganic material. In the embodiment of the present disclosure, to prevent the penetration of moisture or oxygen through the insulating films made of an organic material, the end portions of the insulating films made of an organic material may be covered by the insulating films made of an inorganic material so as not to be exposed to the outside. For example, the first via film VIA1, the second via film VIA2, and pixel defining film PDL made of an organic material do not continuously extend to the non-display area NDA, and may be covered by the first encapsulation film ENC1. Accordingly, an upper surface of the pixel defining film PDL, and side surfaces of the first via film VIA1, the second via film VIA2, and the pixel defining film PDL are encapsulated by the encapsulation film TFE including an inorganic material, so that they may not be exposed to the outside.

However, whether or not the encapsulation film TFE is multi-layered or the material thereof is not limited thereto, and may be variously changed. For example, the encapsulation film TFE may include a plurality of organic material layers and a plurality of inorganic material layers alternately stacked.

A first sensing electrode layer ISM1 may be disposed on the encapsulation film TFE. In some embodiments, an additional buffer film may be disposed between the first sensing electrode layer ISM1 and the encapsulation film TFE. The first sensing electrode layer ISM1 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

A first sensing insulating film ISI1 may be present on the first sensing electrode layer ISM1. The first sensing insulating film ISI1 may be an inorganic insulating film made of an inorganic material. As the inorganic material, an inorganic insulating material such as polysiloxane, a silicon nitride, a silicon oxide, or a silicon oxynitride may be used.

A second sensing electrode layer ISM2 may be present on the first sensing insulating film ISI1. For example, the second sensing electrode layer ISM2 may be in direct contact with the first sensing insulating film ISI1. The second sensing electrode layer ISM2 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

Various input detectors may be configured by using the first sensing electrode layer ISM1, the first sensing insulating film ISI1, and the second sensing electrode layer ISM2, which will be described later in FIG. 13 to FIG. 15.

In the embodiment of FIG. 11, the second sensing electrode layer ISM2 may be patterned to configure a first pattern IST1a of the first sensing wire IST1.

A second sensing insulating film ISI2 may be present on the second sensing electrode layer ISM2. For example, the second sensing insulating film ISI2 may cover the second sensing electrode layer ISM2. The second sensing insulating film ISI2 may be formed of an organic film. For example, as the organic material, an organic insulating material such as a polyacryl-based compound, a polyimide-based compound, a fluorine-based carbon compound such as Teflon, and a benzocyclobutene compound may be used. For example, the second sensing insulating film ISI2 may be made of polymethyl methacrylate, polydimethylsiloxane, polyimide, acrylate, polyethylene terephthalate, or polyethylene naphthalate.

Hereinafter, the non-display area NDA, the first additional area ADA1, and the second additional area ADA2 will be described. In the cross-sectional view of FIG. 11, the non-display area NDA and the first additional area ADA1 will not be separately described. Hereinafter, in the description of the non-display area NDA and the second additional area ADA2, the contents that are described above will be omitted or simply described to avoid duplication of description.

A dam DAM may be disposed at a boundary of the second encapsulation film ENC2. For example, the dam DAM may be disposed between a planarization film FLT and the second encapsulation film ENC2. The dam DAM may have a multi-layered structure, and for example, may include a first dam DAM1 and a second dam DAM2. For example, the first and second dams DAM1 and DAM2 may be made of an organic material. Each of the first and second dams DAM1 and DAM2 may correspond to one of the first via film VIA1, the second via film VIA2, and the pixel defining film PDL. For example, when the first dam DAM1 is made of the same material through the same process as the first via film VIA1, the second dam DAM2 may be made of the same material through the same process as the second via film VIA2 or the pixel defining film PDL. As another example, when the first dam DAM1 is made of the same material through the same process as the second via film VIA2, the second dam DAM2 may be made of the same material through the same process as the pixel defining film PDL. In addition, when a spacer is formed on the pixel defining film PDL of the display area DA, the dam DAM may be formed by using the same material as the spacer.

The dam DAM prevents the organic material of the second encapsulation film ENC2, which has strong fluidity, from overflowing to the outside of the dam DAM during the manufacturing process. The first and third encapsulation films ENC1 and ENC3 made of an inorganic material cover the dam DAM and extend, thereby enhancing adhesion to the substrate SUB or other films on the substrate SUB.

The first pad PDE1 is disposed on the substrate SUB, but may be spaced apart from the planarization film FLT. The first pad PDE1 may be supported by a second insulating film group ING2. Each of the insulating films of the second insulating film group ING2 may correspond to each of the insulating films of the first insulating film group ING1. The first pad PDE1 may include a first pad electrode PDE1a and a second pad electrode PDE1b. The first pad electrode PDE1a may be made of the same material as the first connection pattern CNP1. The second pad electrode PDE1b may be made of the same material as the second connection pattern CNP2.

The planarization film FLT is disposed on the substrate SUB, but may be spaced apart from an area covered by the encapsulation film TFE. The planarization film FLT may be an organic insulating film made of an organic material. As the organic material, an organic insulating material such as a polyacryl-based compound, a polyimide-based compound, a fluorine-based carbon compound such as Teflon, and a benzocyclobutene compound may be used.

In the present embodiment, the planarization film FLT may be formed after the interlayer insulating film ILD is formed and before the first connection pattern CNP1 is formed. Accordingly, the planarization film FLT and the first via film VIA1 may be formed through different processes. In some embodiments, the planarization film FLT and the first via film VIA1 may include different organic materials.

An end of the planarization film FLT may cover the first insulating film group ING1. In addition, a portion of the planarization film FLT corresponding to the second bending area BA2 may fill a first trench TCH1 between the first insulating film group ING1 and the second insulating film group ING2.

Since the inorganic insulating films have high hardness and low flexibility compared with the organic insulating films, the probability of occurrence of cracks is relatively high. When cracks occur in the inorganic insulating films, the cracks may propagate to wires on the inorganic insulating films, and eventually, defects such as wire breakage may occur.

Accordingly, as shown in FIG. 11, the inorganic insulating films are removed from the second bending area BA2, so that the first trench TCH1 may be formed, and the first insulating film group ING1 and the second insulating film group ING2 may be divided. For example, the planarization film FLT may be provided between the first insulating film group ING1 and the second insulating film group ING2. In the present embodiment, it is shown that all of the inorganic insulating films corresponding to an area of the first trench TCH1 are removed, but in another embodiment, some of the inorganic insulating films may remain. In this case, some remaining inorganic insulating films may include slits, thereby dispersing bending stress.

A second pattern IST1b of the first sensing wire IST1 may be extended on the planarization film FLT, and may be electrically connected to the first pad PDE1. The second pattern IST1b may be connected to the first pattern IST1a. In the present embodiment, the second pattern IST1b may be made of the same material as the first connection pattern CNP1, through the same process.

A first wire protective film LPL1 may cover the planarization film FLT and the second pattern IST1b. In addition, a second wire protective film LPL2 may cover the first wire protective film LPL1. In some embodiments, the second wire protective film LPL2 may be omitted. The first and second wire protective films LPL1 and LPL2 may be made of an organic material. Each of the first and second wire protective films LPL1 and LPL2 may correspond to one of the first via film VIA1, the second via film VIA2, and the pixel defining film PDL. For example, when the first wire protective film LPL1 is made of the same material through the same process as the first via film VIA1, the second wire protective film LPL2 may be made of the same material through the same process as the second via film VIA2 or the pixel defining film PDL. As another example, when the first wire protective film LPL1 is made of the same material through the same process as the second via film VIA2, the second wire protective film LPL2 may be made of the same material through the same process as the pixel defining film PDL.

The first and second wire protective films LPL1 and LPL2 and the first sensing insulating film ISI1 may include a first opening OPN1 exposing the second pattern IST1b.

The first pattern IST1a may be connected to the second pattern IST1b through the first opening OPN1. According to the present embodiment, a height of the second pattern IST1b disposed on the planarization film FLT corresponding to one end of the first insulating film group ING1 may be greater than a height of the second pattern IST1b disposed on the planarization film FLT corresponding to the first trench TCH1.

Accordingly, the first pattern IST1a and the second pattern IST1b may be directly connected without a bridge wire, and since there is no bridge wire, the connection reliability between the first pattern IST1a and the second pattern IST1b is improved. In addition, since a length of the non-display area NDA may be reduced by as much as a length of the bridge wire, it is possible to reduce a dead space and to easily realize a thin bezel.

A third pattern IST1c of the first sensing wire IST1 may connect the first pad PDE1 and the second pattern IST1b of the first sensing wire IST1. The third pattern IST1c may be made of the same material by the same process as the gate electrode GE of the transistor. In some embodiments, the third pattern IST1c may be made of the same material by the same process as the upper electrode UE of the capacitor Cst. In some embodiments, the odd numbered third pattern IST1c may be formed of the same material in the same process as the gate electrode GE of the transistor, and the even numbered third pattern IST1c may be formed of the same material in the same process as the upper electrode UE. Conversely, in some embodiments, the even numbered third pattern IST1c may be formed of the same material in the same process as the gate electrode GE of the transistor, and the odd numbered third pattern IST1c may be formed of the same material in the same process as the upper electrode UE. Accordingly, a short circuit between adjacent wires may be more efficiently prevented.

The second insulating film group ING2 may include a second opening OPN2 exposing the third pattern IST1c. In addition, the planarization film FLT may include an opening corresponding to the second opening OPN2. The second pattern IST1b may be connected to the third pattern IST1c through the second opening OPN2.

Figure 12:
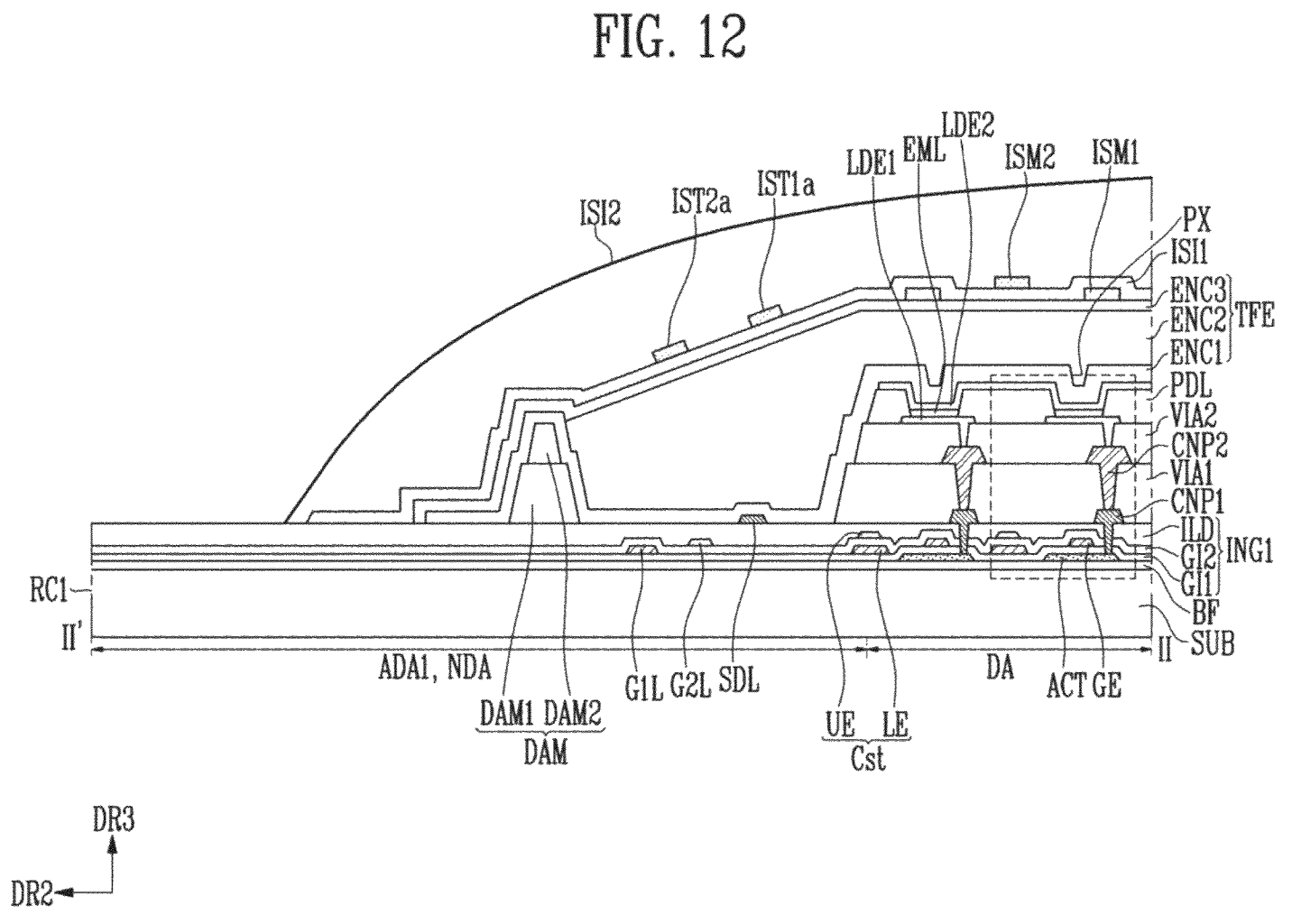

FIG. 12 is a cross-sectional view taken along line II-II' of FIG. 10.

The line II-II' of FIG. 10 may correspond to the first bending axis BX1. However, the same embodiment may be applied to not only the first lateral surface RC1 but also the second lateral surface RC2.

The display wires DST may be configured of a single-layered wire or a multi-layered wire by using at least one of wires G1L, G2L, and SDL. The wire GIL may be made of the same material by the same process as the gate electrode GE of the transistor. The wire G2L may be made of the same material by the same process as the upper electrode UE of the capacitor Cst. The wire SDL may be made of the same material by the same process as the first connection pattern CNP1.

The patterns IST1*a* and IST12*a* of the sensing wires IST1 and IST2 are disposed on the encapsulation film TFE and the first sensing insulating film ISI1 (with respect to the third direction DR3), and are disposed between the dam DAM and the display area DA (with respect to the second direction DR2). The first sensing insulating film ISI1 may be disposed between the encapsulation film TFE and the sensing wires IST1 and IST2.

Figure 13:
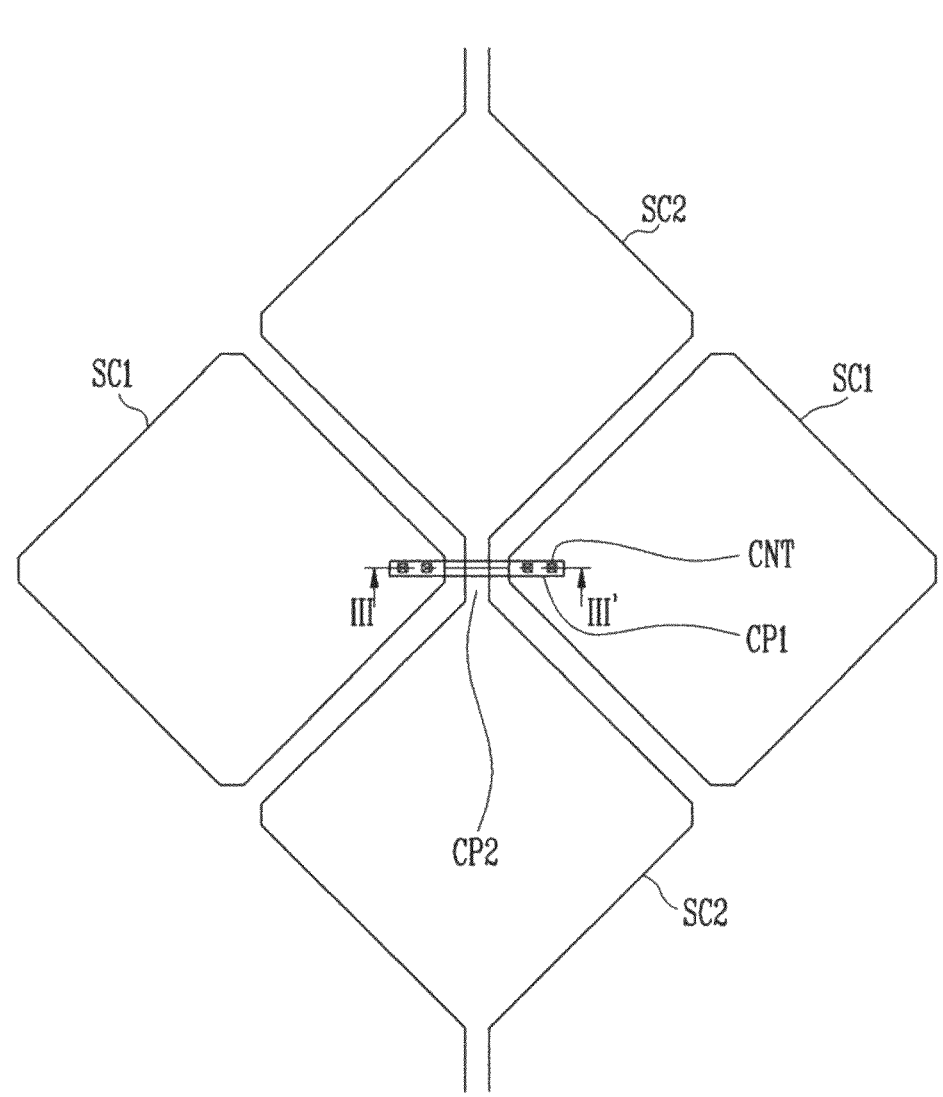
Figure 14:
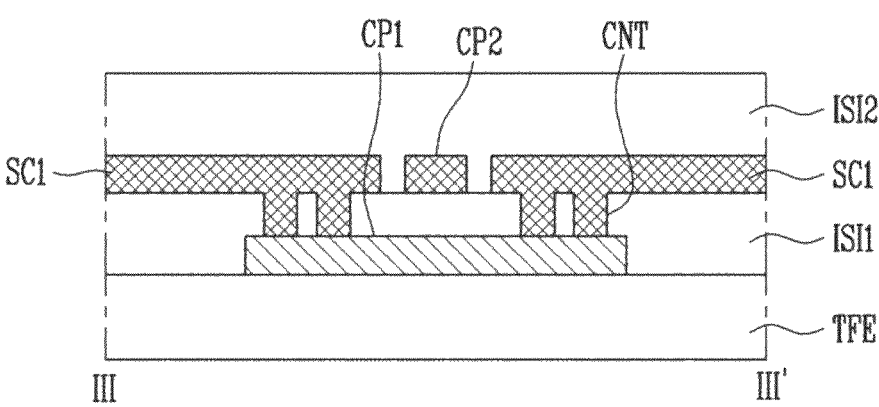

FIG. 13 and FIG. 14 illustrate sensing electrodes and bridge electrodes according to an embodiment of the present disclosure. FIG. 14 illustrates a cross-sectional view taken along line III-III' of FIG. 13.

Bridge electrodes CP1 may be disposed on the encapsulation film TFE by patterning the first sensing electrode layer ISM1.

The first sensing insulating film ISI1 covers the bridge electrode CP1, and may include contact holes CNT exposing some of the bridge electrodes CP1.

The first sensing electrodes SC1 and the second sensing electrodes SC2 may be formed on the first sensing insulating film ISI1 by patterning the second sensing electrode layer ISM2. The first sensing electrodes SC1 may be connected to the bridge electrode CP1 through the contact holes CNT. Adjacent first sensing electrodes SC1 may be connected to each other via the bridge electrode CP1.

The second sensing electrodes SC2 may have a connection pattern CP2 in the same layer by patterning the second sensing electrode layer ISM2. Accordingly, a separate bridge electrode may not be necessary to connect the second sensing electrodes SC2.

In some embodiments, each of the sensing electrodes SC1 and SC2 may cover a plurality of pixels PX. In this case, when each of the sensing electrodes SC1 and SC2 is formed of an opaque conductive film, a plurality of openings through which the plurality of pixels PX covered may be exposed may be included. For example, each of the sensing electrodes SC1 and SC2 may be configured in a mesh shape. When each of the sensing electrodes SC1 and SC2 is formed of a transparent conductive film, each of the sensing electrodes SC1 and SC2 may be formed in a form of a plate without an opening.

Figure 15:
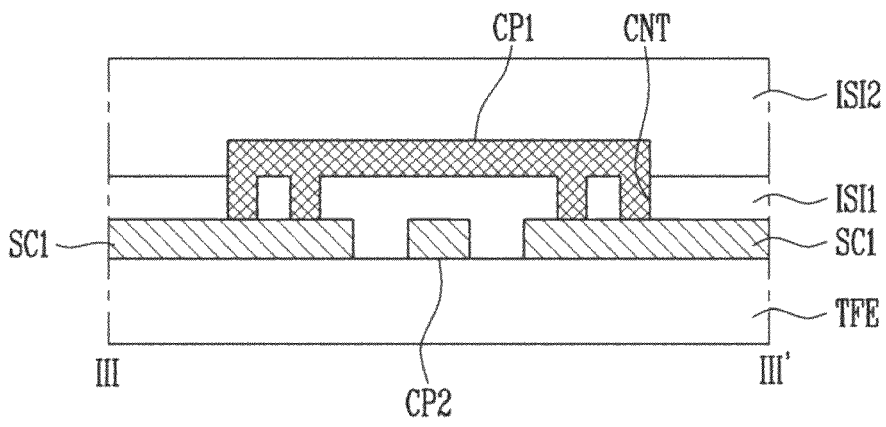

FIG. 15 illustrates sensing electrodes and bridge electrodes according to another embodiment of the present disclosure.

FIG. 15 illustrates another cross-sectional view taken along line III-III' of FIG. 13.

The first sensing electrodes SC1 and the second sensing electrodes SC2 may be formed by patterning the first sensing electrode layer ISM1 disposed on the encapsulation film TFE.

The first sensing insulating film ISI1 may cover the first sensing electrodes SC1 and the second sensing electrodes SC2, and may include the contact holes CNT exposing some of the first sensing electrodes SC1.

The bridge electrodes CP1 may be formed by patterning the second sensing electrode layer ISM2 disposed on the first sensing insulating film ISI1. The bridge electrodes CP1 may be connected to the first sensing electrodes SC1 through the contact holes CNT.

While this disclosure has been described in connection with what is presently considered to be example embodiments, it is to be understood that the disclosure is not limited to the disclosed embodiments. For example, the present disclosure is intended to cover various modifications and equivalent arrangements included within the spirit and scope of the appended claims.

What is claimed is:

1. A touch sensor comprising:
first touch electrodes;
scan lines connected to the first touch electrodes; and
a controller that applies a scan signal to each of the scan lines,
wherein the scan signal includes a plurality of unit signals in a first time period and a second time period, and includes a gap signal in a gap period between the first time period and the second time period, and
an amplitude of each of the plurality of unit signals is greater than an amplitude of the gap signal,
wherein the scan signal of a single one of the scan lines is continuously sinusoidal during a repeating sequence of the first time period, the gap period and the second time period.

2. The touch sensor of claim 1, wherein
a frequency of each of the plurality of unit signals and a frequency of the gap signal are the same.

3. The touch sensor of claim 1, wherein
each of the plurality of unit signals and the gap signal are sinusoidal signals.

4. The touch sensor of claim 1, wherein
each of the plurality of unit signals includes a first sinusoidal signal or a second sinusoidal signal having an opposite phase to the first sinusoidal signal.

5. The touch sensor of claim 1, further comprising:
second touch electrodes configured to form mutual capacitances with the first touch electrodes,
wherein the controller receives sensing signals from the second touch electrodes to generate touch data, and
determines whether a first target signal among the sensing signals corresponds to one of the plurality of unit signals or to the gap signal.

6. The touch sensor of claim 5, wherein
the controller calculates an amplitude of the first target signal,
determines that the first target signal corresponds to one of the plurality of unit signals when the amplitude of the first target signal is greater than a first reference value, and
determines that the first target signal corresponds to the gap signal when the amplitude of the first target signal is less than or equal to the first reference value.

7. The touch sensor of claim 5, wherein
the controller calculates a frequency of the first target signal,
determines that the first target signal corresponds to one of the plurality of unit signals when the frequency is a second reference value, and
determines that the first target signal corresponds to the gap signal when the frequency is not the second reference value.

8. The touch sensor of claim 5, wherein
the controller decodes the first target signal to generate a digital code when it is determined that the first target signal corresponds to one of the plurality of unit signals.

9. The touch sensor of claim 8, wherein
when the first target signal includes a first sinusoidal signal, the digital code is a first value, and
when the first target signal includes a second sinusoidal signal having an opposite phase to the first sinusoidal signal, the digital code is a second value.

10. The touch sensor of claim 5, wherein
the controller, when it is determined that the first target signal corresponds to the gap signal, determines whether a second target signal among the sensing signals corresponds to one of the plurality of unit signals or to the gap signal, and the second target signal is received after the first target signal.

11. The touch sensor of claim 1, wherein the gap period occurs directly after the first time period, and the second time period occurs directly after the gap period.

12. An electronic device comprising:

a touch sensor comprising:

first touch electrodes;

scan lines connected to the first touch electrodes;

a controller that applies a scan signal to each of the scan lines, wherein the scan signal includes a plurality of unit signals in a first time period and a second time period, and includes a gap signal in a gap period between the first time period and the second time period, and an amplitude of each of the plurality of unit signals is greater than an amplitude of the gap signal; and second touch electrodes configured to form mutual capacitances with the first touch electrodes, wherein the controller receives sensing signals from the second touch electrodes to generate touch data, determines whether a first target signal among the sensing signals corresponds to one of the plurality of unit signals or to the gap signal, calculates an amplitude of the first target signal, determines that the first target signal corresponds to one of the plurality of unit signals when the amplitude of the first target signal is greater than a first reference value, and determines that the first target signal corresponds to the gap signal when the amplitude of the first target signal is less than or equal to the first reference value.

13. An electronic device comprising:

a touch sensor comprising:

first touch electrodes;

scan lines connected to the first touch electrodes;

a controller that applies a scan signal to each of the scan lines, wherein the scan signal includes a plurality of unit signals in a first time period and a second time period, and includes a gap signal in a gap period between the first time period and the second time period, and an amplitude of each of the plurality of unit signals is greater than an amplitude of the gap signal; and second touch electrodes configured to form mutual capacitances with the first touch electrodes, wherein the controller receives sensing signals from the second touch electrodes to generate touch data, determines whether a first target signal among the sensing signals corresponds to one of the plurality of unit signals or to the gap signal, calculates a frequency of the first target signal, determines that the first target signal corresponds to one of the plurality of unit signals when the frequency is a second reference value, and determines that the first target signal corresponds to the gap signal when the frequency is not the second reference value.

* * * * *